US012036488B2

(12) United States Patent
Takahashi et al.

(10) Patent No.: US 12,036,488 B2
(45) Date of Patent: Jul. 16, 2024

(54) METHOD FOR OPERATING FILTRATION DEVICE

(71) Applicant: Fuji Filter Manufacturing Co., Ltd., Tokyo (JP)

(72) Inventors: Yuichi Takahashi, Tokyo (JP); Hiroyuki Takahashi, Tochigi (JP); Akinori Horigome, Tochigi (JP)

(73) Assignee: FUJI FILTER MANUFACTURING CO., LTD., Tokyo (JP)

( * ) Notice: Subject to any disclaimer, the term of this patent is extended or adjusted under 35 U.S.C. 154(b) by 748 days.

(21) Appl. No.: 16/487,760

(22) PCT Filed: Nov. 30, 2017

(86) PCT No.: PCT/JP2017/043035
§ 371 (c)(1),
(2) Date: Aug. 21, 2019

(87) PCT Pub. No.: WO2018/216247
PCT Pub. Date: Nov. 29, 2018

(65) Prior Publication Data
US 2019/0388808 A1 Dec. 26, 2019

(30) Foreign Application Priority Data
May 23, 2017 (JP) .................................. 2017-101682

(51) Int. Cl.
*B01D 29/23* (2006.01)
*B01D 29/11* (2006.01)
(Continued)

(52) U.S. Cl.
CPC .............. *B01D 29/23* (2013.01); *B01D 29/11* (2013.01); *B01D 29/64* (2013.01); *B01D 46/681* (2022.01);
(Continued)

(58) Field of Classification Search
CPC ............ B01D 2239/1216; B01D 29/11; B01D 29/23; B01D 29/64; B01D 29/6415;
(Continued)

(56) References Cited

U.S. PATENT DOCUMENTS

| 5,085,771 A | * | 2/1992 | Huang | ............... B01D 29/6415 |
| | | | | 210/512.3 |
| 2003/0098273 A1 | * | 5/2003 | Benenson, Jr. | ...... B01D 29/668 |
| | | | | 210/393 |

FOREIGN PATENT DOCUMENTS

| JP | 2003509200 | 3/2003 |
| JP | 2008507391 A | 3/2008 |

(Continued)

OTHER PUBLICATIONS

Toro, Automatic Backwash Filter Assembly, Oct. 18, 2016, p. 13 (Year: 2016).*

(Continued)

*Primary Examiner* — Chester T Barry
(74) *Attorney, Agent, or Firm* — Juan Carlos A. Marquez; Marquez IP Law Office, PLLC

(57) ABSTRACT

A filtration device efficiently sizes removal of unnecessary substances adhering to and deposited on a filter medium of a filter element during filtration and backwashing (cleaning) from target (non-filtered) substances. The filter element captures substances in a fluid on one surface of a filter medium. The captured substances are separated from the filter medium during backwashing. A brush moves relative to the one surface of the filter medium and assists in separating the captured substances and sifting during the relative movement. The backwashing starts when a differential pressure between both surfaces of the filter medium exceeds a predetermined value, or the like while performing the filtration, and returns to filtration after the differential pressure is eliminated or after a predetermined time elapses.

(Continued)

The brush sifts the unnecessary substances from the captured substances and passes the removal to the other surface side during the filtration.

7 Claims, 9 Drawing Sheets

(51) Int. Cl.
| | | |
|---|---|---|
| *B01D 29/64* | (2006.01) | |
| *B01D 46/681* | (2022.01) | |
| *B01D 46/682* | (2022.01) | |
| *B01D 29/66* | (2006.01) | |
| *B01D 33/06* | (2006.01) | |
| *B01D 39/12* | (2006.01) | |
| *B01D 46/24* | (2006.01) | |

(52) U.S. Cl.
CPC ............ *B01D 46/682* (2022.01); *B01D 29/66* (2013.01); *B01D 33/06* (2013.01); *B01D 39/12* (2013.01); *B01D 46/24* (2013.01)

(58) Field of Classification Search
CPC ...... B01D 29/66; B01D 29/688; B01D 33/06; B01D 33/073; B01D 33/461; B01D 33/503; B01D 37/046; B01D 39/12; B01D 46/0056; B01D 46/0065; B01D 46/0068; B01D 46/24; B01D 46/2403; B01D 46/26; B01D 46/446; B01D 46/46; B01D 29/52; B01D 29/668; B01D 29/15; B01D 29/6476; B01D 2201/0453; B01D 29/117; B01D 29/60; B01D 29/62; B01D 29/6423; B01D 29/6446; B01D 29/6484; B01D 29/68; B01D 46/681; B01D 46/70; B01D 2201/0415; B01D 2201/08; B01D 2201/16; B01D 2201/34; B01D 2201/58; B01D 2265/06; B01D 2267/30; B01D 2271/00; B01D 24/48; B01D 29/071; B01D 29/118; B01D 29/35; B01D 29/50; B01D 29/54; B01D 29/606; B01D 29/6438; B01D 29/682; B01D 29/70; B01D 29/72; B01D 29/86; B01D 29/902; B01D 29/904; B01D 35/12; B01D 35/26; B01D 41/00; B01D 46/58; B01D 46/60; B01D 46/68; B01D 46/682; B01D 46/72; B01D 65/04; B01D 46/71; C02F 1/001; C02F 1/008; C02F 2103/007; C02F 2103/008; C02F 2103/023; C02F 2103/08; C02F 2201/005; C02F 2303/16
See application file for complete search history.

(56) References Cited

FOREIGN PATENT DOCUMENTS

| | | | |
|---|---|---|---|
| JP | 2012016672 A | | 1/2012 |
| JP | 2012135729 A | | 7/2012 |
| JP | 2013091046 A | * | 5/2013 |
| JP | 2013091046 A | | 5/2013 |
| JP | 2013150947 A | | 8/2013 |
| JP | 2014034029 A | | 2/2014 |
| JP | 2015013235 A | | 1/2015 |
| JP | 2017006876 A | | 1/2017 |
| KR | 200411185 Y1 | * | 3/2005 |
| KR | 1020100116087 A | | 10/2010 |
| KR | 20130107907 A | * | 3/2012 |
| KR | 1020130107907 A | | 10/2013 |
| WO | 200121277 A1 | | 3/2001 |
| WO | 2006008729 A1 | | 1/2006 |

OTHER PUBLICATIONS

International Search Report and Written Opinion dated Feb. 6, 2018, issued in counterpart International Application No. PCT/JP2017/043035 (7 pages in Japanese).
Korean Office Action mailed Nov. 30, 2021, in Korean counterpart application 10-2019-7037790, 6 pages in Korean.
Korean Office Action mailed Oct. 31, 2022,in Korean counterpart application 10-2019-7037790, 6 pages in Korean.

* cited by examiner

A-A CROSS-SECTIONAL VIEW

B-B CROSS-SECTIONAL VIEW (IMAGE AS VIEWED FROM FILTRATION SURFACE SIDE)

METHOD FOR OPERATING FILTRATION DEVICE

FIELD

The present invention relates to a method for operating a filtration device that effectively separates and sifts removal unnecessary substances from substances captured by a filter element to prevent clogging in a filtration device having a backwashing function or a cleaning function, so as to reduce the frequency of backwashing and cleaning.

BACKGROUND

Conventionally, for filtration of water such as seawater, lake water, river water, drinking water, sewage water, filtration of liquid used in general in industries, such as cooling water or process solution of various apparatuses, and filtration of various fluid-state raw materials including gas, powder, particles, and powder and granular particles used in a chemical plant or the like, a variety of filtration devices are used for the purpose of capturing and removing fine particles, dust, and the like contained therein.

If filtration by a filtration device is continued for a long period, solid contents, gelatinous dust, and the like, which are unable to pass through openings of the filter element and captured thereon, accumulate on a filter medium surface, and resistance to a fluid passing through openings of the filter medium increases, and eventually, filtration of the fluid becomes difficult. In order to address this problem, for example, an operation called "backwashing" is regularly performed to peel off the captured substances adhering to the filter element by passing a fluid through the filter element in a direction opposite to that during filtration, thereby recovering filtration performance of the filter element.

Although the operation of backwashing is effective, the captured substances adhering to the filter element may remain without being completely removed by backwashing. In this case, even if the filtration and the restoration by backwashing are repeated, resistance of the filter medium constituting the filter element to the fluid may not decrease, making it difficult to filter a target fluid.

In order to address this problem, filtration devices provided with measures for recovering the filtration performance of the filter element have been proposed.

Patent Literature 1 and Patent Literature 2 disclose a filter body having a captured-substance removal brush movably arranged in an axial direction inside a hollow cylindrical filter element, the captured-substance removal brush being moved in the axial direction by flow of fluid during filtration or backwashing, thereby removing the captured substances adhering to an inner surface of the filter element.

Patent Literature 3 discloses a configuration such that a rotor having a spiral blade is rotatably arranged inside a cylindrical filter element having an opening at one end, and a peripheral edge of the rotating spiral blade slides on an inner surface of the filter element during backwashing, thereby removing captured substances adhering thereto.

By such a conventional cleaning method combining a brush and backwashing, substances captured on a primary-side filtration surface of the filter element during filtering include, besides intended removal target substances with particle diameters larger than openings of the filter element, removal unnecessary substances (valuable substances) that have particle diameters smaller than the openings and are not desired to be removed, but in reality, operating of the brush during backwashing even removes these removal unnecessary substances, causing them to be discharged to outside of the system.

Although a main purpose of the filtration is to remove removal target substances, it is a matter of course that removal unnecessary substances constituted of particles smaller than an opening diameter of the filter element are captured to some extent, and such a filtration has been rather evaluated as having high filtration performance. That is, as particles are captured at openings of the filter element and narrows the opening diameter, a phenomenon that even smaller particles are gradually captured occurs, which determines an important part of the performance of filtration. Furthermore, particles captured in this manner include particles made by aggregation and growth of fine particles, gelatinous particles, and particles that are captured by the filter element but easily crumble because of low strength. Depending on raw liquid as the filtration target, particles smaller than the filter element openings, that is, particles which do not need to be filtered out, or particles which should not be removed, may be removed by a large amount. Examples of the filtration target can include ceramic raw material slurry, pigment slurry, coating solution for paper or film, heavy oil, cooling water, and ballast water of ships.

Next, in the case of a ballast-water filtration device for a ship, what need to be removed by filtration with the filter element are living organisms of a certain size or larger, and fibrous algae and the like do not need to be removed. However, fibrous algae and the like tend to be entangled in the filter medium, and are captured in the filter medium at a certain ratio when filtration is performed. Since other particles, other living organisms, and the like are also captured in the filter medium, when such particles and the like are combined together and covered with viscous substances, recovery to the initial state is very difficult just by backwashing using a filtrate as in the filtration device of Patent Literature 4. Finally, complicated work such as opening a filter tank, and removing and cleaning the filter element for recovery must be carried out.

As one step advanced from the filtration device of Patent Literature 4, in a filtration device as in Patent Literature 5 that crushes filter-captured substances covered with viscous substances by brushing during backwashing and discharges them to outside of the system, it was possible to repeat filtration and backwashing for a longer period than in the case of only backwashing with a filtrate as in Patent Literature 4. However, when filtration and backwashing were further repeated for a longer period in this ballast water filtration, a rise of differential pressure still occurred, and cleaning by a method other than backwashing became necessary.

When the filter element was removed to investigate for causes, it was recognized that fibrous algae were clogged on a filtrate side (a secondary side) in the filter element. It was found that this clogging was caused by capturing of algae in a peripheral edge of an opening when the filtrate passed from the filtrate side to a raw liquid side (a primary side) during backwashing. Even in this case, a phenomenon occurred such that the fibrous algae covered with viscous substances were entangled in and adhere to the peripheral edge of the opening.

Consequently, it was found that clogging from an opposite direction did not occur if backwashing to pass liquid from the opposite side in a filtration direction of the filter element was not performed. Therefore, it is important to reduce the number of times of backwashing in order to reduce an incidence rate of clogging from the opposite direction.

When ballast water is filtered in a ship, it is unnecessary to capture fibrous algae with a filter element because they are normally sufficiently small, but whether fibrous algae pass through openings of the filter element depends on the direction of the fibrous algae to the openings. That is, even when fibrous algae once pass through the openings of the filter element when filtration is performed, the fibrous algae may be captured when passing through the openings again during backwashing. The same phenomenon may occur in relations with other plankton and shapeless particles.

That is, in the filtration device that uses a filtrate resulted from filtration of raw liquid as it is as backwashing liquid for backwashing, when shapeless particles or fibrous algae are included in the raw liquid, a possibility to block the openings of the filter element becomes high not only in filtration but also in backwashing.

When a solid content of a predetermined concentration or more is contained in raw liquid, and particles having sizes close to an opening diameter of a filter element are contained therein, a plurality of particles simultaneously flow into an opening of the filter element during filtration and block the opening in a manner of supporting each other at the entrance or inside of the opening. A phenomenon may also occur such that particles themselves aggregate to be a clump larger than the opening diameter and captured at the opening. FIG. 10(*a*) is an image view of a state that clogging occurs on a filtration side of a filter medium 400 as viewed from a direction orthogonal to a filter medium surface, and FIG. 10(*b*) is a cross-sectional view illustrating the clogging state on the filtration side. FIGS. 10(*a*) and 10(*b*) illustrate a state that a plurality of particles simultaneously enter openings 400A of the filter medium 400 while supporting each other and block them.

Next, FIG. 10(*c*) is a cross-sectional view illustrating a state that clogging occurs on a backwashing side by backwashing. Clogging that occurs during filtration is likely to occur also during backwashing. In an opening that is not recovered from clogging by backwashing, particles attempting to pass through the opening cause further clogging during the backwashing. Since the liquid no longer flows in this opening, the particles are then pressed together and solidified, and the clogging gradually becomes strong. When it is solidified by gelatinous or strongly adhesive substances, the clogging becomes even stronger.

During a filtration operation, although substances captured by openings of the filter element can be removed by backwashing by the filtration device as described in Patent Literature 4 or by backwashing while brushing as in Patent Literature 5, since this method performs backwashing every time the openings of the filter element are blocked, if solids are captured from a direction opposite to the filtration direction of the filter element openings during backwashing, the filter does not have a mechanism to remove them.

As an actual example in which even valuable components contained in raw liquid being filtered are captured and removed by a filter element, a filtration device of fuel oil C for marine diesel engine fuel can be mentioned. Substances to be filtered and removed in fuel oil C are FCC residues and hard coke particles. However, when fuel oil C is filtered by a wire netting or another type of filter medium (a notch wire, a wedge wire, a metal etching plate, or the like) with an opening diameter less than 50 μm, even components of the fuel oil having turned into a gelatinous state, which can be used as fuel, are captured besides these particles and cause early blocking of the filter element openings. The fuel oil components having turned into a gelatinous state can be contained in fuel oil C by a large amount, and backwashing is performed to cause the openings to be recovered from this clogging. Because most of filter elements often used for filtration of fuel oil C use a filtrate as backwashing liquid, effective components in the filtrate are captured, and the effective components are further discharged to outside as the backwashing liquid and lost. Furthermore, it is difficult to completely peel off the fuel oil components transformed into a gelatinous state from the openings of the filter element during backwashing, and part of the components is often left, which shortens the intervals of backwashing. Accordingly, much more effective filtrate components are to be lost by backwashing.

It is desirable that non-filtered substances (removal necessary substances) such as coarse particles peeled off from a filter medium surface settle and remain on a bottom portion of a primary side in a casing. However, in practice, due to the influence of the filter element or rotation of a brush and even the influence of fluid to be filtered flowing in through a casing inlet, these non-filtered substances may float up and adhere again to the filter medium surface. If the non-filtered substances adhere again to the filter medium surface, it is obvious that the efficiency of filtration decreases.

CITATION LIST

Patent Literatures

Patent Literature 1: Japanese Patent Application Laid-open No. 2013-91046
Patent Literature 2: Japanese Patent Application Laid-open No. 2014-34029
Patent Literature 3: Japanese Patent Application Laid-open No. 2013-150947
Patent Literature 4: Japanese Patent Application National Publication No. 2003-509200
Patent Literature 5: Japanese Patent Application Laid-open No. 2017-6876

SUMMARY

Technical Problem

The present invention has been made in view of the above problem, and it is an object thereof to provide a method for operating a filtration device capable of efficiently separating removal unnecessary substances adhering to and deposited on a filter medium of a filter element during filtration and backwashing (cleaning) from removal target substances, so that the removal unnecessary substances can be used effectively.

Solution to Problem

In order to achieve the above object, the present invention provides a method for operating a filtration device, wherein the filtration device comprises: a filter element having a filter medium; a brush arranged to be capable of making a relative movement with respect to one surface of the filter medium and assisting in separating (removing) captured substances and sifting with respect to the captured substances during the relative movement; a driving unit relatively moving at least one of the brush or the filter element with respect to the other; a filtration mechanism passing a fluid from one surface side to the other surface side of the filter medium and a backwashing mechanism passing a fluid from the other surface side to the one surface side of the filter medium; a casing supporting at least the filter element, the filtration mechanism, and the backwashing mechanism; and a control unit, wherein the operating method of a filtration device comprises starting the backwashing when a differential pressure between the both surfaces of the filter medium exceeds a predetermined value or as triggered by a lapse of a predetermined time while performing the filtration, and returning to the filtration after the differential pressure is eliminated or after a predetermined time elapses, and the control unit performs a sifting operation of driving the driving unit to relatively move the brush with respect to the filter medium so as to sift removal unnecessary substances from the captured substances and pass the removal unnecessary substances to the other surface side during the filtration.

Advantageous Effects of Invention

According to the present invention, it is possible to efficiently separate removal unnecessary substances adhering to and deposited on a filter medium of a filter element during filtration and backwashing (cleaning) from removal target substances, so that the removal unnecessary substances can be used effectively.

DESCRIPTION OF EMBODIMENTS

Figure 1:
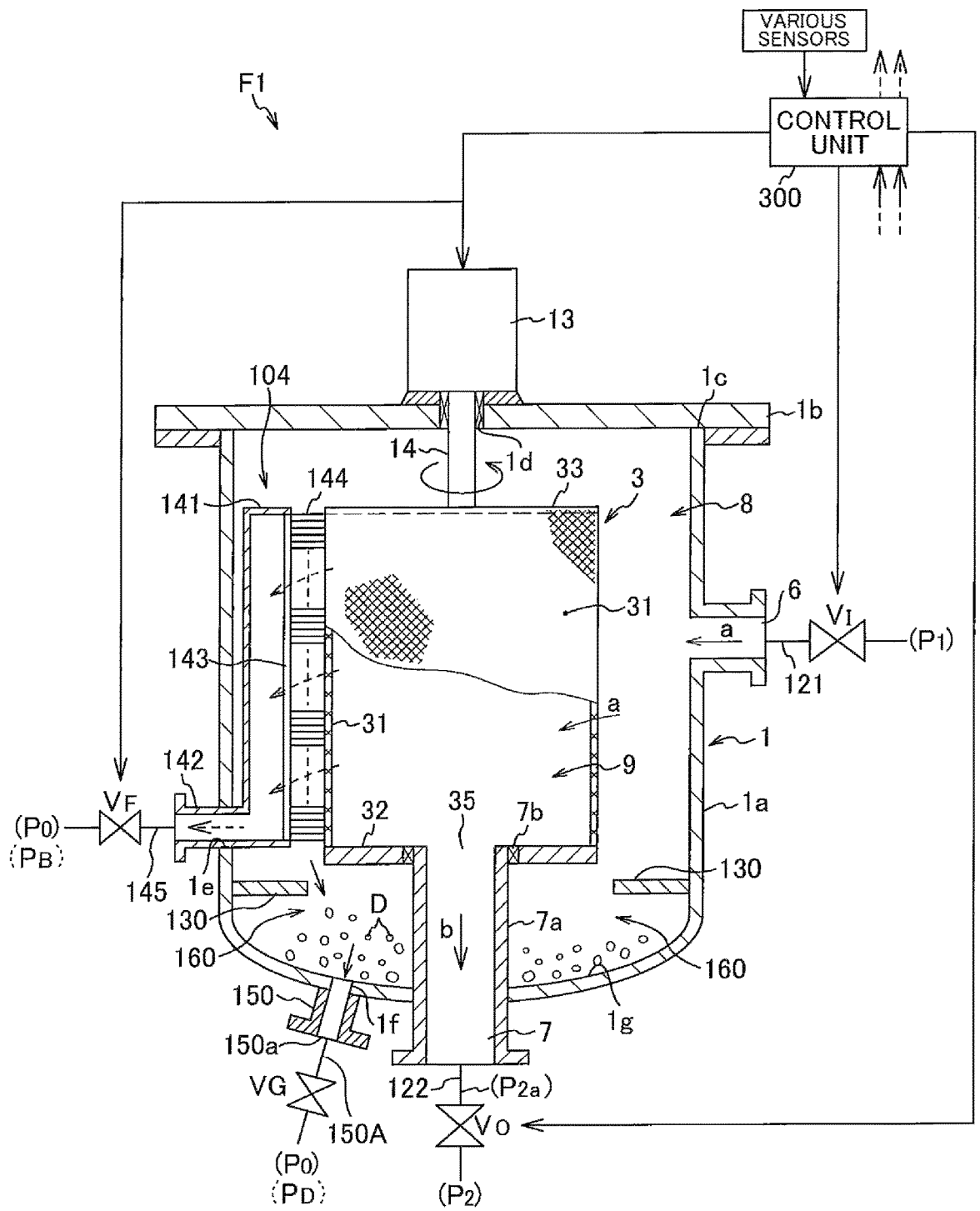
FIG. 1 is a schematic vertical cross-sectional view illustrating an overall configuration of a first embodiment of a filtration device according to a first application example of an operating method of the present invention.

A method for operating a filtration device according to one embodiment of the present invention will be described blow in detail by embodiments illustrated in the drawings.
[Basic Principle of Operating Method According to Present Invention]

A method for operating a filtration device according to the present invention has a characteristic that the filtration device includes a filter element having a filter medium constituted of a metal mesh material, in which during filtration to pass a fluid from one surface side to the other surface side of the filter medium, substances in the fluid are captured on the one surface, and during backwashing to pass a fluid from the other surface side to the one surface side of the filter medium, the captured substances are separated from the filter medium, a brush arranged to be capable of making a relative movement with respect to the one surface of the filter medium and assisting in separating (removing) the captured substances and sifting with respect to the captured substances during the relative movement, a driving unit relatively moving at least one of the brush or the filter element with respect to the other, a filtration mechanism passing a fluid from the one surface side to the other surface side of the filter medium during filtration and a backwashing mechanism passing a fluid from the other surface side to the one surface side of the filter medium during backwashing, a casing supporting at least the filter element, the filtration mechanism, and the backwashing mechanism, and a control unit controlling the driving unit, the filtration mechanism, and the backwashing mechanism, and performs an operating method including starting the backwashing when a differential pressure between the both surfaces of the filter medium exceeds a predetermined value or as triggered by a lapse of a predetermined time while performing the filtration, and returning to the filtration after the differential pressure is eliminated or after a predetermined time elapses.

The present operating method is characterized in that the control unit performs an operation of driving the driving unit to relatively move the brush with respect to the filter medium so as to sift removal unnecessary substances from the captured substances and pass the removal unnecessary substances to the other surface side during a filtration operation at a start of filtration and during filtration resumed after backwashing is finished.

In the operation of sifting the removal unnecessary substances from the captured substances, when a plurality of particles constituting the removal unnecessary substances are solidified, the brush is relatively moved on a filter medium wall so as to size (crush) solidified particles into a size with which the particles can pass through openings of the filter medium.

The captured substances in the present description are substances captured on a primary side of the filter medium before sifting by brushing, and refer to a concept including removal necessary substances and removal unnecessary substances. The non-filtered substances include, besides substances (removal necessary substances) larger than filter holes and captured by the filter medium without passing through the filter medium, substances mainly containing remaining particles from which removal unnecessary substances such as substances crushed by brushing are removed. The definitions are matters common to all the following application examples and embodiments.

One embodiment of the present invention is to perform an operation to brush a primary side surface of the filter medium of the filter element during a filtration operation to disperse captured substances and filter cakes captured thereon, and let matters smaller than an opening diameter of the filter element (removal unnecessary substances) flow to a downstream side (a secondary side) of the filter element to be dispersed in the filtrate for collection.

In other words, there is performed sifting including crushing filter-captured substances adhering to the primary side of the filter element by brushing during a filtration operation, thereby letting matters smaller than the openings of the filter element flow out to the downstream side, and leaving only removal necessary substances such as coarse particles larger than the opening diameter of the filter element on the primary side of the filter element.

In the present method for operating a filtration device, it is desirable that the non-filtered substances (removal necessary substances) such as coarse particles peeled off from the filter medium surface settle and remain in a bottom portion of the primary side in the casing. However, in practice, due to the influence of the filter element or rotation of the brush and even the influence of a fluid to be filtered flowing in through a casing inlet, these non-filtered substances may float up and adhere again to the filter medium surface. As a measure therefor, a structure is provided in which a retention part for non-filtered substances having settled inside the casing is provided, retained non-filtered substances are appropriately discharged (drained out) to outside by a retained-substance discharging unit, and furthermore a part (a baffle plate) for preventing floating up of the non-filtered substances as necessary is provided to let these coarse particles efficiently settle and be drained out.

In the method for operating a filtration device according to the present invention, the retained substances having dropped and been retained in the casing bottom portion are substances such that removal unnecessary substances are removed from captured substances captured on the primary side surface of the filter medium, for example, non-filtered substances such as coarse particles.

A clogging time during filtration is significantly delayed as a result of performing the sifting operation during filtration, and clogging from an opposite side can be reduced by decreasing the number of times of backwashing.

When ship ballast water is assumed as a fluid as a filtration target, a filter medium of the filter element constituted of a sintered metal mesh preferably has a mesh opening diameter of 100 μm or less, preferably in the range of 50 μm±30 μm.

In the present embodiment, although ship ballast water is exemplified as a fluid as the filtration target, for example, it is also possible to target at ceramics raw material slurry, pigment slurry, coating liquid for paper or film or the like, heavy oil, and cooling water.

Besides liquid and gas, for example, the sifting is also useful for screening powders (synthetic resins, paints, pigments, metal powders, potters, and ceramics), waste water treatment, and screening of unnecessary components from coating liquids.

The filtration recognized in general is directed to filtering all solids without screening. On the other hand, the sifting according to the present invention is directed to separating and screening solids by size, which differs in its essential meaning, purpose, and effect from mere filtration.

In the following descriptions, a configuration example of a filtration device to which an operating method according to one embodiment of the present invention is applicable is explained.

A. Filtration Device According to First Application Example

Figure 2:
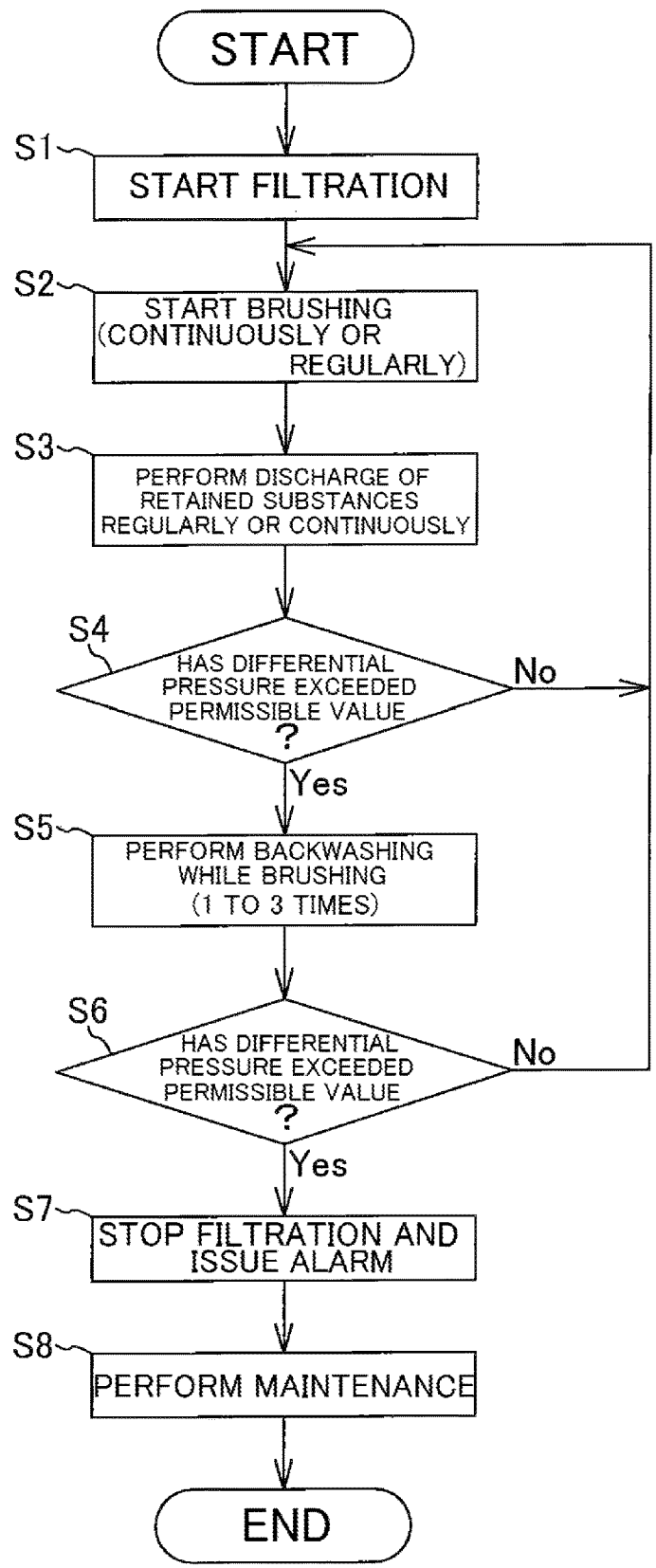
FIG. 2 is a flowchart illustrating a procedure of an operating method according to one example of the present invention.

FIG. 1 to FIG. 3 are explanatory views of a filtration device according to a first application example of the operating method of the present invention.

A-1: Filtration Device According to First Embodiment

FIG. 1 is an explanatory view illustrating an overall configuration of a first embodiment of the filtration device according to the first application example of the present invention. For example, this filtration device is to filter ship ballast water, and perform filtration of a fluid by allowing the fluid from a fluid inlet to pass through a filter element and flow out through a fluid outlet.

The filtration device does not perform backwashing of the filter element such that the flow passage of a fluid is switched by an external piping system upon backwashing, and the fluid is introduced from the fluid outlet and passed through the filter element, and caused to flow to the fluid inlet.

A filtration device F1 according to the first embodiment schematically includes a casing 1, a partition wall 2, a filter element 3, a driving unit 13, filtration mechanisms 6, 7, 8, 9, $V_1$, and $V_0$, a backwashing mechanism 104, a control unit (such as a CPU) 300, and the like.

The filtration device F1 uses the backwashing mechanism 104 constituted of a backwashing head arranged in surface-contact with a portion of the filter element, and the like as a backwashing unit, and has a high backwashing effect due to a strong suction force and a removal brush.

The casing 1 forms an outer shell of the filtration device F1 and is constituted of a casing body 1a and a casing lid 1b. The casing body 1a is formed in a bottomed cylindrical shape (for example, a cylindrical shape), a rectangular parallelepiped shape, or the like. For example, the casing body 1a has a fluid inlet 6 through which a fluid flows in from outside located at an appropriate position of a side wall, which is an upper portion higher than an intermediate height position in this example, and has a fluid outlet 7 through which a fluid filtered inside flows to outside at a bottom portion of the casing body. The casing lid 1b is a lid mounted on top of the casing body 1a and sealing the inside of the casing 1.

The inside of the casing 1 is divided into a raw liquid chamber 8 in outside of the filter element 3, and a filtrate chamber 9 in the inside of the filter element 3. The raw liquid chamber 8 communicates the inside of the casing 1 with the fluid inlet 6, and accommodates fluid before filtration. The filtrate chamber 9 communicates with the fluid outlet 7 and accommodates a fluid after filtration.

Inside the casing 1, the cylindrical filter element 3 is provided in a vertical direction in the raw liquid chamber 8, and is rotatably and axially supported therein.

This filter element 3 is a filter that passes and filters a fluid from the raw liquid chamber side to the filtrate chamber side, has a filter medium 31 forming a cylindrical surface, a lower blocking plate 32 forming a lower end portion, and an upper blocking plate 33 forming an upper end portion, and passes a fluid as a target through the filter medium 31 from outside toward the inside, so as to capture and filter solid contents, gelatinous dust, and the like contained in the fluid.

Figure 3A:
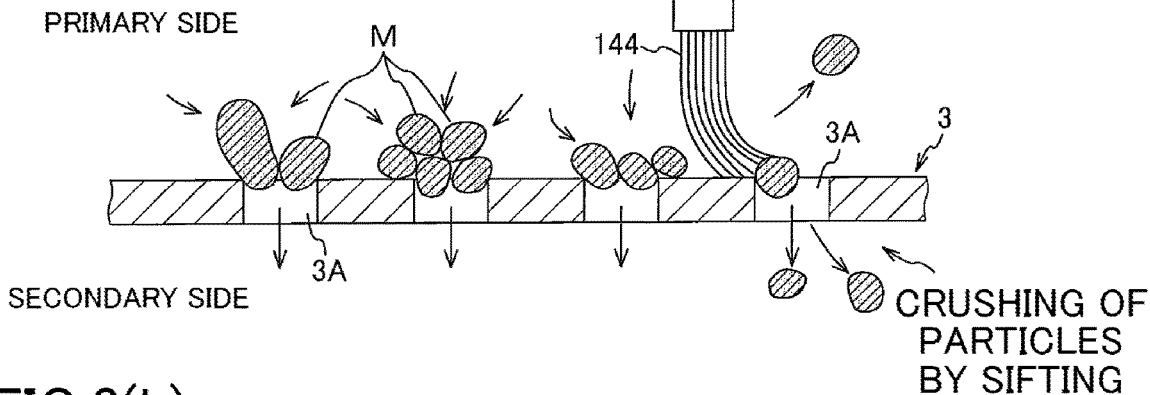
FIGS. 3(a) and 3(b) are enlarged cross-sectional views of relevant parts of a filter medium illustrating a state that sifting is performed by brushing and FIG. 3(c) is a sectional view illustrating an example of a metal mesh to be used as a filter medium.
Figure 3B:
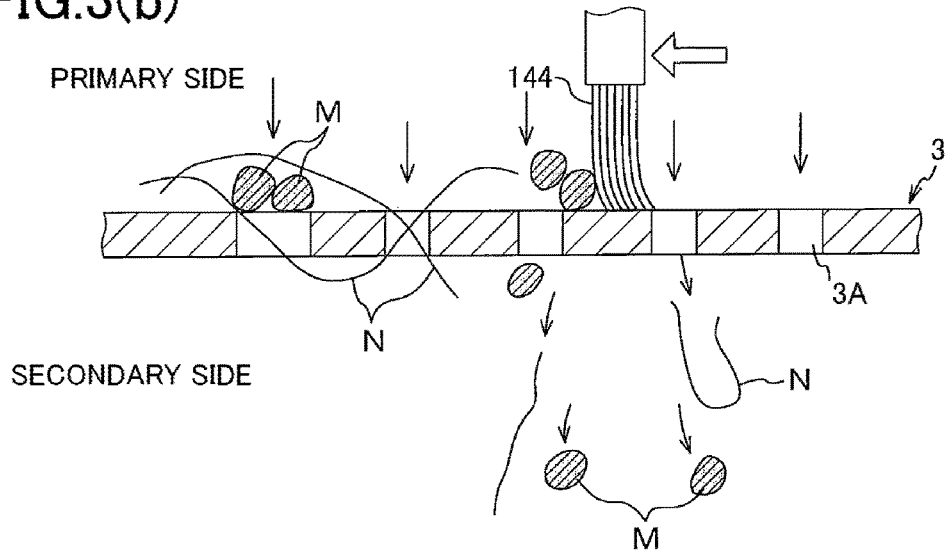
Figure 3C:
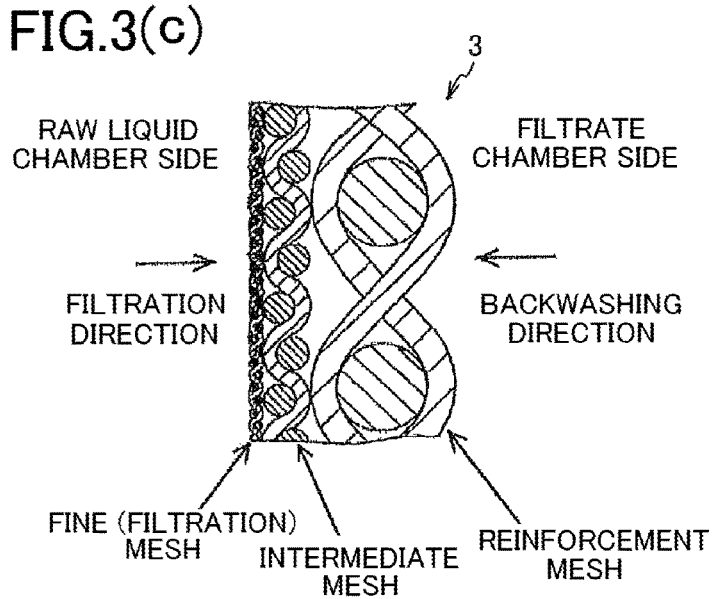

The filter medium 31 is a stack of a plurality of layers as illustrated in FIG. 3(c) and, in the case that a filtration direction is from outside to the inside, it suffices that the outermost layer (on the raw liquid chamber side) is the finest mesh. For example, one in which a plurality of layered wire nettings are sintered to increase shape retention and formed in a cylindrical shape and sintered, one constituted of a cylindrical notch wire, one constituted of a wedge wire, or the like can be used. In the case of the sintered one, an appropriate selection may be made from layers with a mesh size of 10 to 200 µm for the innermost layer, and from layers with a mesh size of 200 to 5000 µm for a layer inside the innermost layer. In this case, a reinforcement mesh and a protective mesh other than the outermost layer are related to the strength of the filter element 3, for which the number of layers, the mesh size, and the diameter of wires are selected so as to obtain necessary strength. As the way of weaving the meshes, plain weave, twilled weave, satin weave, Dutch weave, twilled Dutch weave, and the like may be employed. Sintering may be performed in a state that the outermost layer is a wire netting, and for example, a cylindrical punching plate in which innumerable square holes are bored inside and a reinforcing member having a plurality of thin rods arranged in vertical and horizontal directions are arranged inside the wire netting.

When the filtration direction is from the inside to outside, which is opposite to that in FIG. 3(c), the innermost layer is the finest mesh.

The lower blocking plate 32 forms a circular plate, has an outer periphery fixed to a lower peripheral edge of the cylindrical filter medium 31, and is rotatably and axially supported by a bearing part 7b provided on a pipe body 7a in which an opening 35 provided in a center portion constitutes the fluid outlet 7. This bearing structure is merely an example.

On the other hand, the upper blocking plate 33 also forms a circular plate and has an outer periphery fixed to an upper peripheral edge of the cylindrical filter medium 31. A center portion of this upper blocking plate 33 is connected to a rotation shaft 14 extending from a geared motor (the driving unit) 13 provided on an upper side of the casing lid 1b and passing through a through hole 1d (the bearing part) of the casing lid 1b. Accordingly, the filter element 3 is rotatable by the geared motor 13.

The backwashing mechanism 104 is arranged in surface-contact with a portion of the filter medium 31 of the filter element 3 from the raw liquid chamber 8 side, performs backwashing of the filter medium 31 by sucking a fluid (filtrate) on the filtrate chamber 9 side through the filter medium 31 and discharging the sucked fluid to outside of the casing 1, and includes a backwashing head 141 and a backwashing-fluid discharge pipe 142.

In the present description, "suction" is not necessarily limited to drawing in of a fluid by a lower pressure than the atmospheric pressure, and generally means to draw a fluid into a side with a relatively lower pressure when there is a pressure difference.

This backwashing mechanism 104 and a rotation mechanism of the filter element 3 constituted of the geared motor 13 and the like as a surface-contact-position moving unit between the backwashing head 141 and the filter medium constitute a backwashing unit of the present embodiment. The backwashing head 141 is a substantially tubular member arranged in surface-contact with a portion of the filter medium 31 to suck a fluid on the filtrate chamber side through openings (filter holes) of the filter medium 31 and having both axial ends closed, and is provided in parallel to an axial direction of the filter medium 31 in surface-contact with outside of the filter medium 31. In the surface-contact portion, a suction hole 143 in a slit shape is provided to cover a substantially entire length of the filter medium 31, and a removal brush 144 is planted in a periphery thereof. By performing backwashing (sucking toward outside of the filter medium) while rotating the filter element 3 by the geared motor 13, the whole surface of the filter medium 31 can be backwashed while scraping off captured substances with the removal brush 144.

Because the removal brush 144 is constantly in contact with an outer surface of the filter medium, by rotating the filter element 3 during a filtration operation in which an opening-closing valve $V_F$ of a backwashing-fluid discharge system is closed, the outer surface of the filter medium is also brushed during the filtration operation.

For example, a material for brush bristles of the removal brush 144 is natural or synthetic fiber, or metal wire such as steel, copper, or brass, or the like, and is selected depending on the purpose of use of the filtration device and the fluid to be passed.

On the other hand, near a lower end of the backwashing head 141, the backwashing-fluid discharge pipe 142 is branched and connected toward an opposite side of the surface-contact side with the filter medium 31. This backwashing-fluid discharge pipe 142 discharges the fluid inside the filter medium that is sucked into the backwashing head 141 to outside of the casing 1, and extends to outside while penetrating a through hole provided in a side surface of the casing body 1a to be connected to a discharge pipe 145 of outside via a flange. The opening-closing valve $V_F$ is provided in this discharge pipe 145. This opening-closing valve $V_F$ controls flowing out and stopping of the backwashing fluid, and is opened during backwashing of the filtration device and closed at other times. A discharge side of this opening-closing valve $V_F$ is connected to a drain side opened to a pressure lower than the pressure of the fluid outlet 7, that is, an atmospheric pressure $P_0$, for example.

A drain pipe (the retained-substance discharging unit) 150 for discharging non-filtered substances, which communicates with the raw liquid chamber 8, is connected to another portion of the casing lower side, and the drain pipe 150 is connected to the drain side opened to the atmospheric pressure ($P_0$), for example, via a drain side valve $V_G$ (the retained-substance discharging unit) arranged in a middle portion. The drain pipe 150 and the drain side valve $V_G$ are parts (the retained-substance discharging unit) to discharge non-filtered substances D falling to and retained on the partition wall 2 (a non-filtered-substance retention unit 160) from the filter medium 31 by brushing performed during filtration to outside of the casing.

As an outside piping system of a filtration target fluid that is connected to the filtration device F1, inlet side piping 121 is connected to the fluid inlet 6 of the casing 1, and the inlet side piping 121 has an inlet side valve $V_I$ in a middle portion and is connected to a raw liquid supply source (a filtration mechanism) having a primary pressure (P1). On the other hand, outlet side piping 122 is connected to the fluid outlet 7 of the casing 1, and this outlet side piping 122 has an outlet side valve $V_O$ in a middle portion and is connected to a filtrate storage tank or the like having a secondary pressure ($P_2$). The discharge pipe 145 of outside is connected to the backwashing-fluid discharge pipe 142, and the discharge pipe 145 has the opening-closing valve $V_F$ in a middle portion and is connected to the drain side opened to the atmospheric pressure ($P_O$), for example.

In order to perform backwashing in this case, it is necessary to apply a pressure from outside by a method such as controlling the outlet side valve $V_O$, to set a pressure Pea inside the filter element 3 to be higher than the atmospheric pressure ($P_O$). Because the opening-closing valve $V_F$ and the drain side valve $V_G$ are not always connected to an open-to-atmosphere portion, this point applies to all the following application examples and embodiments.

Even if the opening-closing valve $V_F$ (the discharge pipe 145) and the drain side valve $V_G$ (the drain pipe 150) are open to the atmospheric pressure, it is allowable that, for example, a pump for decompression (not illustrated) (a pump suction) is connected to each of the opening-closing valve $V_F$ and the drain side valve $V_G$, so as to decrease the pressure of the valve $V_F$ side to be lower than the secondary pressure, and to decrease the pressure of the valve $V_G$ side to be lower than the primary pressure.

In the present method for operating the filtration device F1, it is desirable that the non-filtered substances such as coarse particles peeled off from the filter medium surface settle and remain in the bottom portion of the primary side in the casing. However, in practice, due to the influence of the filter element or rotation of the brush and even the influence of a fluid to be filtered flowing in through the casing inlet, these non-filtered substances may float up and adhere again to the filter medium surface. As a measure therefor, a structure is provided in which the non-filtered-substance retention unit 160 for storing coarse particles and the like as removal target substances (non-filtered substances) inside the casing is provided, retained non-filtered substances are appropriately discharged (drained out) to outside by the retained-substance discharging unit 150, $V_G$, and furthermore, a part (a baffle plate) for preventing floating up of the substances is provided as a part for preventing floating up of the non-filtered substances as necessary to let these coarse particles efficiently settle and be drained out.

Because the present invention employs a configuration to discharge an appropriate amount of non-filtered substances dropping in the casing bottom portion to outside of the system through the drain pipe 150 having a small diameter arranged near the non-filtered-substance retention unit 160, only a small amount of liquid is needed for discharging the non-filtered substances. An operation to separate and take out effective substances contained in the non-filtered substances in a small amount of fluid discharged from the drain pipe 150 also becomes easy.

By selecting a position where the flow of water and the quantity of water are small and retention easily occurs in the casing as the position for arranging the drain pipe 150, the non-filtered substances can be discharged through the drain pipe 150 in a short time at a time of discharge while preventing floating up of the non-filtered substances retained in the non-filtered-substance retention unit 160.

In the configuration example of FIG. 1, an outer peripheral portion of the pipe body 7a constituting the fluid outlet 7 is a location where a fluid "a" from the fluid inlet cannot smoothly circulate and non-filtered substances dropping from the filter medium easily settle and are retained. Accordingly, this region is selected as the non-filtered-substance retention unit 160, and the drain pipe 150 is arranged in the casing bottom portion corresponding to this region.

In other embodiments described below, a location to arrange the drain pipe 150 is to be selected on the basis as described above.

In principle, the above descriptions on the method for operating a filtration device apply to all the following application examples and embodiments.

Operations of the filtration device F1 of the first embodiment configured as above are as follows.

During filtration, the filter element 3 is rotated, the inlet side valve $V_I$ and the outlet side valve $V_O$ are opened, and the opening-closing valve $V_F$ of the backwashing-fluid discharge system is closed. A fluid to be filtered is filtered by flowing into the raw liquid chamber 8 of the casing 1 from the fluid inlet 6 as indicated by a solid arrow "a", passing through a portion where the backwashing head 141 of the cylindrical filter medium 31 is not in contact, and flowing into the filter element 3. The filtered fluid flows into the filtrate chamber 9, passes through the fluid outlet 7, and flows out to outside as indicated by an arrow "b".

At this time, the captured substances (such as solid substances and gelatinous dust) attempting to adhere or having adhered to the outer surface of the filter medium with which the removal brush 144 is in contact are brushed and released from adhesion by rotating the filter element, or solidified removal unnecessary substances are crushed and pass through the openings of the filter medium. In this manner, the substances to be removed and the removal unnecessary substances are sifted by brushing during filtration, and the removal unnecessary substances can be passed to the secondary side.

Accordingly, not only it is possible to let most of the removal unnecessary substances included in the captured substances flow out to the secondary side, but also a rise of the filtration differential pressure can be largely delayed.

As described above, by the sifting operation during filtration, clogging is less likely to occur, and a filtration duration can be prolonged to decrease the number of times of backwashing, thereby increasing the efficiency of the device. An occurrence rate of clogging from the opposite direction by backwashing can also be reduced by decreasing the number of times of backwashing.

During backwashing, while the inlet side valve $V_I$ and the outlet side valve $V_O$ are continued to be open, the opening-closing valve $V_F$ of the backwashing-fluid discharge system is released, the pressure inside the backwashing head 141 in communication via the backwashing-fluid discharge pipe 142 decreases, and as indicated by a dashed arrow, fluid inside the filter element 3 passes through the filter medium 31 and flows in through the suction hole 143. Accordingly, a portion of the filter medium 31 in a thin-strip form (linear form) in surface-contact with the suction hole 143 is backwashed. By rotating the filter element 3, the whole circumferential surface of the filter medium 31 is backwashed while scraping off captured substances with the removal brush 144. However, even during backwashing, the fluid to be filtered flows into the raw liquid chamber 8 through the fluid inlet 6 as indicated by the solid arrow, and thus the filtration is continued on a portion in the cylindrical filter medium 31 that is not in surface-contact with the backwashing head 141. The backwashing is performed by a predetermined frequency for a predetermined time depending on use conditions of the filtration device (such as a filtration speed and an amount of foreign substances in the fluid), or performed upon detection of an increase in the differential pressure.

In actual operations, backwashing is not to be performed by inflow through the outlet side valve $V_O$ in a state that the inlet side valve $V_I$ is closed. The inlet side valve $V_I$ and the outlet side valve $V_O$ are not operated to be opened or closed except at a time of starting the operation of the filtration device, a time of stopping the operation, and a time of maintenance. These operations apply to all the following application examples and embodiments.

The filtration device F1 according to the first embodiment includes the removal brush 144 arranged to be capable of making a relative movement with respect to the outer surface (a primary side surface) of the filter medium 31 constituting the filter element 3 to perform separating (removing) of captured substances and sifting with respect to the captured substances during the relative movement, the driving unit 13 relatively moving at least one of the removal brush or the filter element with respect to the other, the filtration mechanism, the backwashing mechanism, and the control unit 300 controlling the driving unit, the filtration mechanism, and the backwashing mechanism, and performs an operating method including starting the backwashing when a filtration differential pressure between the both surfaces of the filter medium exceeds a predetermined value or as triggered by a lapse of a predetermined time while performing the filtration, and returning to the filtration after the differential pressure is eliminated or after a predetermined time elapses.

The present operating method is characterized in that the control unit performs an operation of driving the driving unit to relatively move the brush with respect to the filter medium so as to sift removal unnecessary substances from the captured substances and pass the removal unnecessary substances to the other surface side during a filtration operation when the opening-closing valve $V_F$ of the backwashing-fluid discharge system is closed.

In order to solve a problem that a large amount of removal unnecessary substances are discharged to outside of the system by performing brushing during backwashing, it suffices that, by performing only brushing during filtration as in the present embodiment, non-filtered substances such as coarse particles remaining in the filter medium 31 are separated from the filter medium surface to drop, thereby accumulating the non-filtered substances in the non-filtered-substance retention unit 160 in the casing bottom portion, and the drain side valve $V_G$ is subsequently opened at an appropriate timing to discharge the non-filtered substances accumulated in the non-filtered-substance retention unit 160 to outside of the system.

As long as the fluid is introduced from the fluid inlet 6, the non-filtered substances can be discharged any time by opening the drain side valve $V_G$ due to an effect by a line pressure.

When the differential pressure described above rises to exceed a permissible value after the non-filtered substances accumulated in the non-filtered-substance retention unit 160 are discharged to outside by opening the drain side valve $V_G$, it is also allowable that the opening-closing valve $V_F$ is opened to release the backwashing-fluid discharge pipe 142.

On the contrary to the above procedure as an operating procedure at the time of rising of the differential pressure, when the differential pressure rises to exceed a permissible value after the opening-closing valve $V_F$ is opened to release the backwashing-fluid discharge pipe 142, it is also allowable that the drain side valve $V_G$ is opened.

While delaying occurrence of clogging during filtration by prolonging the duration of a filtration operation by performing brushing during a filtration operation, removal unnecessary substances in captured substances can be efficiently secured in the filtrate. As a result, the number of times of backwashing and the backwashing time can be reduced, and thus the operation efficiency is increased and occurrence of clogging from the secondary side, which is a demerit of backwashing, can also be prevented.

As described above, only a small amount of liquid is needed for discharging the non-filtered substances from the drain pipe 150 to outside of the system, and an operation to separate and take out effective substances included in the non-filtered substances in a small amount of fluid also becomes easy.

On the other hand, it is also possible to employ a method of causing a fluid flowing in through the fluid outlet 7 to flow back to the fluid inlet 6 upon backwashing, but the amount of liquid to be used for backwashing becomes enormous. That is, in addition to that the element as a target of backwashing becomes large, a long and complicated piping system is also connected. Accordingly, backwashing cannot be performed unless a large supply source is provided on outside of the device so as to secure the large amount of fluid, and captured substances containing effective substances which are accumulated therein are discharged to outside of the system. Furthermore, it is difficult to take out effective substances from the captured substances in the large amount of fluid that is discharged once to outside of the system, and thus it is difficult to effectively use the substances. Therefore, a much larger amount of effective substances is to be lost as compared to the method of the present invention.

In this manner, in the present invention, although it is possible to switch the flow passage of fluid by the external piping system upon backwashing to introduce a large amount of fluid from the fluid outlet 7, and let the fluid pass through the filter element and flow to the fluid inlet 6 so as to perform backwashing of the filter element, it is also possible to perform local backwashing using the backwashing head during filtration. Accordingly, no external equipment such as a pump is necessary and the equipment is simplified, and furthermore, complicated switching operation of a fluid is not necessary, making it possible to perform backwashing with a small amount of fluid.

Further, by preventing floating up of non-filtered substances on the non-filtered-substance retention unit 160 by a baffle plate 130, re-adhesion to the filter medium is prevented, and non-filtered substances to be discharged through the drain pipe 150 can be reliably secured.

Non-filtered substances that have re-adhered to the filter medium surface need to be peeled off and dropped again by brushing, or drained out by backwashing by opening and closing the inlet side valve $V_I$ and the outlet side valve $V_o$. However, according to the operating method of the present invention, it is only necessary to perform backwashing by opening the opening-closing valve $V_F$ of the backwashing-fluid discharge system while simply rotating and brushing the filter element 3.

As described above, "suction" in the present description is not necessarily limited to drawing in of a fluid by a pressure lower than the atmospheric pressure, and generally means to draw a fluid into a side where the pressure is relatively low in the case where there is a pressure difference. Specifically, for example, although the opening-closing valve $V_F$ and the drain side valve $V_G$ of the backwashing-fluid discharge system are connected to the atmospheric pressure ($P_0$) in FIG. 1(b), it is merely an example, and suction may be performed with a pump (not illustrated) via the valves $V_F$ (the discharge pipe 145) and $V_G$ (the drain pipe 150). Therefore, in this case, the relationship between a pressure $P_B$ when the backwashing fluid is sucked (discharged) with a pump via the opening-closing valve $V_F$ of the backwashing-fluid discharge system and the secondary pressure ($P_2$) of the filtrate storage tank is $P_B$<$P_2$. The relationship between a pressure $P_D$ when drain is sucked (discharged) with a pump via the drain side valve $V_G$ and the primary pressure ($P_1$) via the inlet side valve $V_I$ is $P_D$<$P1$. These relations apply to all the following application examples and embodiments.

Characteristic configurations, operations, and effects of the present invention described above apply in common to all the following application examples and embodiments.

FIG. 2 is a flowchart illustrating a procedure of an operating method according to one example of the present invention. The operating procedure according to this flowchart is applied in common to all other application examples and embodiments described below.

When filtration is started, the control unit 300 opens the inlet side valve $V_I$ and the outlet side valve $V_O$, closes the opening-closing valve $V_F$ of the backwashing-fluid discharge system, and rotates the filter element 3, thereby performing an operation to brush the primary side surface of the filter medium regularly or continuously (constantly) with the removal brush 144 to sift removal unnecessary substances from captured substances and let the removal unnecessary substances pass to the other surface side (steps S1, S2). The brushing at step S2 may be intermittent brushing.

At step S3, the drain side valve $V_G$ as the retained-substance discharging unit is used regularly or continuously to release the drain pipe 150, so as to drain out the non-filtered substances D retained in the non-filtered-substance retention unit. At this time, the discharged drain is discarded or returned to another upstream process of the filtration process to be reprocessed depending on the type of the fluid. Particularly in a processing system having other processes, such as ceramic materials, pigments, coating liquid, and heavy oil, the drain is returned to an upstream process for effective utilization.

Next, at step S4, a measuring device for a filtration differential pressure (not illustrated) determines whether a filtration differential pressure has reached a predetermined value, in other words, whether the filtration differential pressure has exceeded a permissible value. When the filtration differential pressure has exceeded the permissible value, the process proceeds to step S5 to start backwashing while brushing. When the filtration differential pressure has not exceeded the permissible value, the process returns to step S2. It is also allowable that a filtration time is measured with a timer at step S4, and the process proceeds to step S5 to start the backwashing when a predetermined filtration time elapses.

In a backwashing operation, the inlet side valve $V_I$ and the outlet side valve $V_O$ are continued to be open, and the opening-closing valve $V_F$ of the backwashing-fluid discharge system is opened.

Even if it is detected that the filtration differential pressure has exceeded the permissible value in measurement of the filtration differential pressure at step S4, when the backwashing while brushing is started thereafter, a filtration differential pressure lower than the permissible value may be detected by the measuring device at a point when the element has only rotated by a slight rotation angle less than one rotation, for example, about 15 degrees. However, at this stage, the backwashing with brushing on the whole circumferential surface of the filter element is not completed, and captured substances still remain on a surface where the brushing is not completed. In order to address such a problem, by counting with a timer as described at step S5, it is necessary to confirm that the element is rotated at least once, or three times at most in this example, to uniformly perform brushing and backwashing on the whole circumferential surface of the element.

After the backwashing while brushing is performed at step S5, when the filtration differential pressure has decreased to a predetermined value (for example, 0.002 MPa) as a result of performing the measurement of the filtration differential pressure at step S6, the process returns to step S2 after the backwashing is completed.

When the filtration differential pressure has not decreased from the predetermined value at step S6, the process proceeds to step S7 to stop the filtration, and issues an alert with an alarm that maintenance is needed at step S8.

When the differential pressure has not decreased to be lower than the permissible value, it is also allowable that discharging of the drain via the retained-substance discharging unit $V_G$, 150 or/and backwashing by the backwashing mechanism are performed.

Which of the backwashing and the retained-substance discharging operation should be performed first or given priority is determined according to circumstances.

Next, FIG. 3 are enlarged cross-sectional views of relevant parts of the filter medium illustrating a state that sifting is performed by brushing.

In FIG. 3(a), at openings 3A of a metal mesh material constituting the filter medium 3, clogging has occurred in a state that particulate removal unnecessary substances M aggregated on the primary side. By slidingly contacting the removal brush 144 with the filter medium along the primary side surface thereof, a distal end of the removal brush crushes particles M in a state of aggregation to disperse them into individual particles. Accordingly, the individual particles can pass to the secondary side in the flow of fluid during filtration, thereby eliminating clogging. In addition, an illustration of removal target substances is omitted in this view.

In FIG. 3(b), fibers N are entangled with the particles M as removal unnecessary substances and cause clogging in openings 3A. By slidingly contacting the removal brush 144 with the filter medium along the primary side surface thereof, the distal end of the removal brush separates the particles M and the fibers N in a state of entanglement to disperse them into individual particles. Accordingly, the individual particles can pass to the secondary side in the flow of fluid during filtration, thereby eliminating clogging.

An example of the metal mesh to be used as the filter medium 3 is illustrated in FIG. 3(c), and one in which a plurality of layered wire nettings are sintered to increase shape retention and formed in a cylindrical shape and sintered is used.

<A-2: Filtration Device According to Second Embodiment>

Figure 4A:
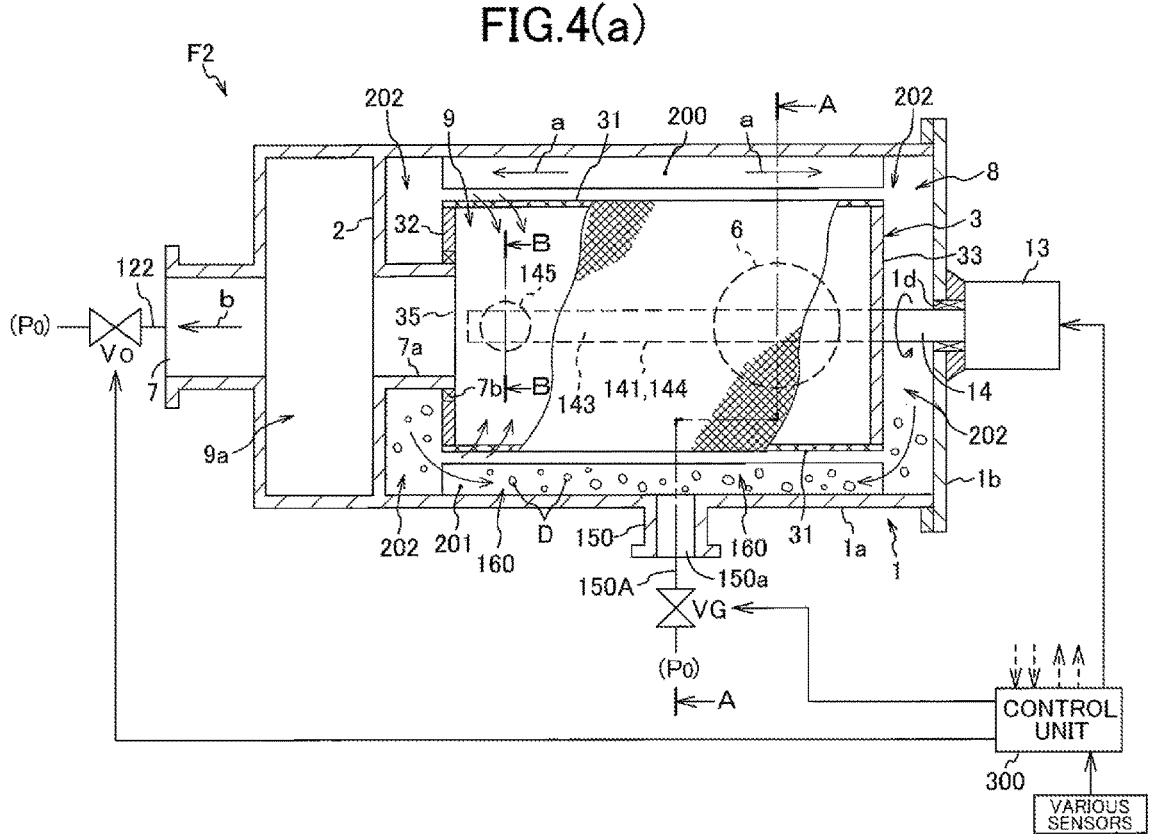
FIG. 4(a) is a schematic vertical cross-sectional view illustrating an overall configuration of a second embodiment of the filtration device according to the first application example of the operating method of the present invention.
Figure 4B:
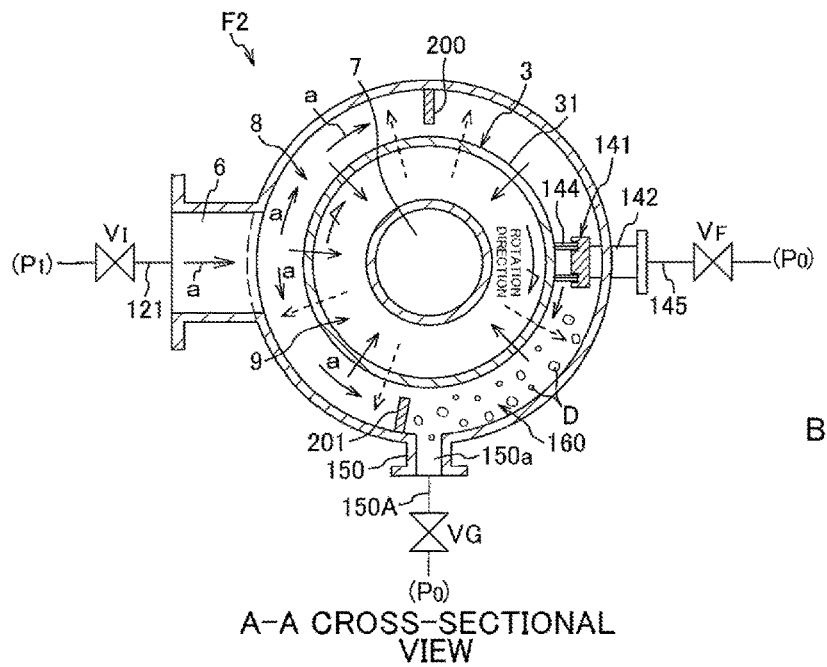
FIG. 4(b) is an A-A cross-sectional view thereof.
Figure 4C:
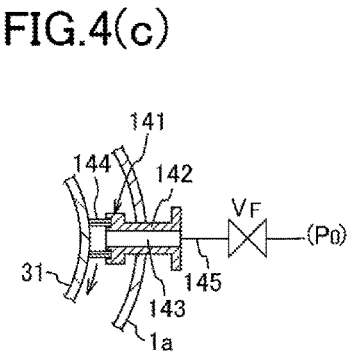
FIG. 4(c) is a B-B cross-sectional view thereof.

FIG. 4(a) is a schematic vertical cross-sectional view illustrating an overall configuration of a second embodiment of the filtration device according to the first application example of the operating method of the present invention, FIG. 4(b) is an A-A cross-sectional view thereof, and FIG. 4(c) is a B-B cross-sectional view thereof.

This filtration device F2 is a modification example of FIG. 1 and is a horizontal type in which the filtration device F1 of FIG. 1 is turned rightward by 90 degrees, and is mainly different in a configuration that shielding plates 200 and 201 are respectively arranged on an upper part and a lower part of a casing inner wall, so as to obstruct passage of fluid attempting to move along an outer peripheral surface of the filter element 3 to change the direction of the fluid to an axial direction. Another difference from FIG. 1 is that the pipe body 7a supporting an opening 35 of a bottom portion of the filter element 3 constitute a part of the partition wall 2, and a filtrate chamber 9a is formed outside the partition wall 2.

Accordingly, parts identical to those in FIG. 1 are denoted by like reference signs and explanations of redundant configurations and operations are omitted.

As illustrated in FIG. 4(b), the fluid "a" introduced from the fluid inlet 6 during filtration and moving in a circumferential direction along an outer periphery of the rotating filter element 3 passes through the filter medium 31 and moves into the filtrate chamber 9, but other fluids "a" whose movement to an opposite side in the circumferential direction (a right side of FIG. 4(b)) is obstructed by the respective shielding plates 200 and 201 in the process of circumferential movement move outward to both axial ends along the shielding plates. The fluids "a" that have moved in the axial direction move to an opposite side (a side where the backwashing head 141 is present) of the respective shielding plates 200 and 201 via spaces 202, 202 formed outside the both axial ends of the filter element 3 and are sucked into the filtrate chamber 9 through the filter medium 31 on the opposite side. The respective fluids having moved to the opposite side of the respective shielding plates 200 and 201 from the left and right spaces 202, 202 collide with each other to decrease in flow speed, and thus the non-filtered substances D separated from the filter medium 31 by the removal brush 144 drop downward and accumulate in the non-filtered-substance retention unit 160. The drain pipe 150 is arranged on the casing bottom portion corresponding to the non-filtered-substance retention unit 160, and the non-filtered substances D can be discharged to outside even during filtration by releasing the drain pipe 150. Accordingly, a problem that the non-filtered substances once retained in the non-filtered-substance retention unit 160 float up and are sucked on the filter medium, or the like can be solved, and an occurrence rate of clogging from the opposite direction can be reduced by decreasing the number of times of backwashing.

As the position for arranging the drain pipe 150 as described above, a position is selected in the casing where the flow of water and the quantity of water are small and retention easily occurs and thus non-filtered substances easily settle and be retained. In the present embodiment, the drain pipe 150 is arranged at a position where the momentum of fluid tends to decrease by decreasing the flow speed by the respective shielding plates 200 and 201.

As illustrated in FIG. 4(c), the removal brush 144 is planted in a periphery of the suction hole 143 in a slit shape covering a substantially entire length of the filter medium 31, and thus captured substances adhering to a primary side filtration surface are crushed at a time of relative rotation of the removal brush and the filtration surface.

Operations of the backwashing mechanism 104 (the backwashing head 141) and respective valves $V_I$, $V_O$, $V_F$, and $V_G$ with respect to the filter element 3 during a filtration operation and a backwashing operation, a flow of filtrate, a flow of backwashing liquid, and a non-filtered-substance discharge operation are identical to those in FIG. 1, and thus redundant explanations thereof are omitted.

The method, procedures, and effects of brushing during filtration are identical to those of the embodiment of FIG. 1.

B. Filtration Device According to Second Application Example

B-1: First Embodiment of Filtration Device

Figure 5:
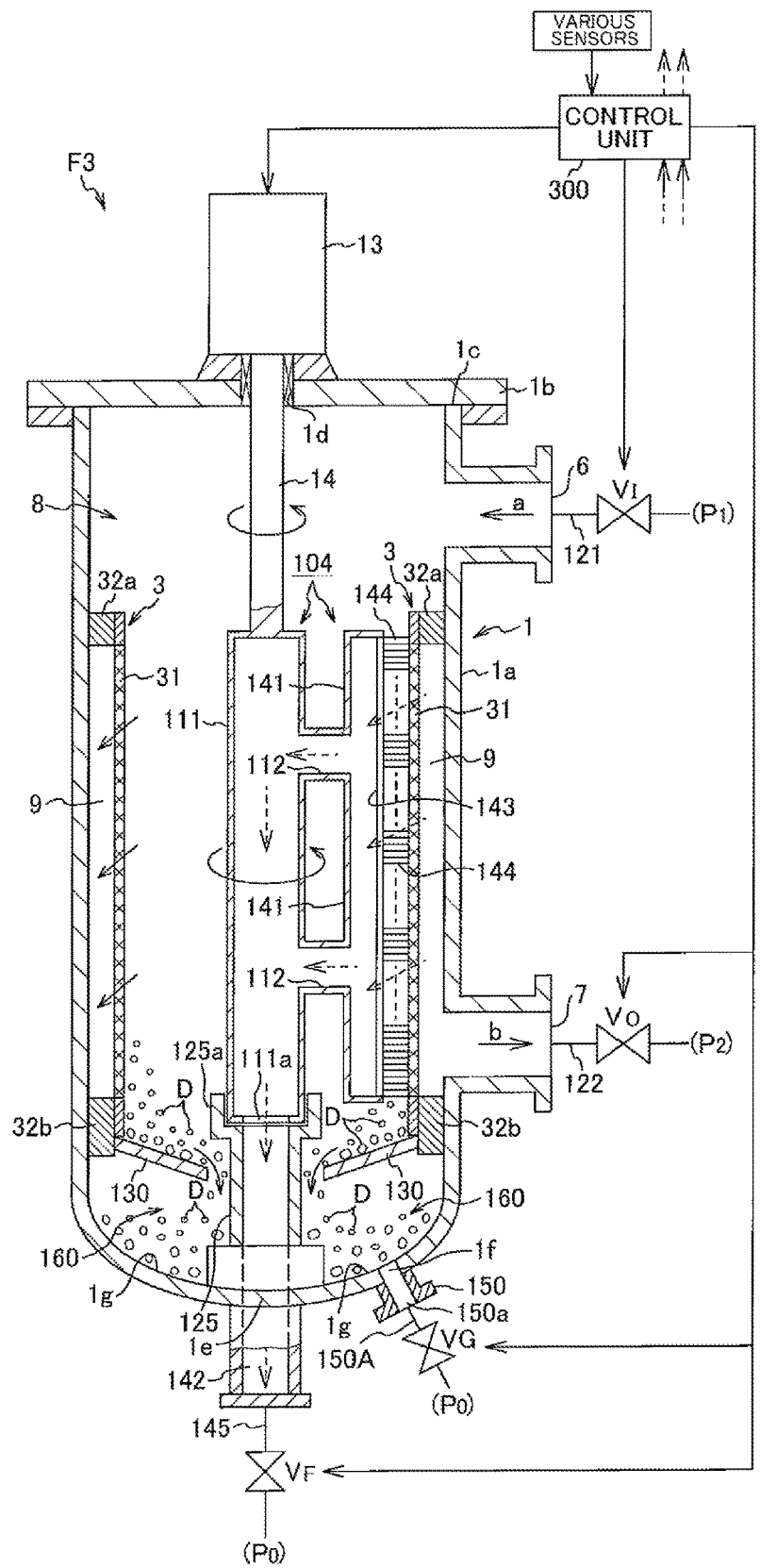
FIG. 5 is a schematic vertical cross-sectional view illustrating an overall configuration of a first embodiment of a filtration device according to a second application example of applying the operating method of the present invention.

FIG. 5 is a schematic vertical cross-sectional view illustrating an overall configuration of a first embodiment of a filtration device according to a second application example of applying the operating method of the present invention.

For example, a filtration device F3 is to filter a fluid such as ceramic raw material slurry, pigment slurry, coating solution to paper or film, heavy oil, cooling water, ship ballast water, and perform filtration by letting the fluid from the fluid inlet 6 pass through the filter element 3 and flow out through the fluid outlet 7. Similarly to the filtration device according to the application example described above, backwashing is performed by using the backwashing mechanism 104 constituted of the backwashing head 141 arranged in surface-contact with a portion of the filter element 3, and the like, but there is a difference in that the filter element is on a fixed side, and the backwashing head 141 and the like are on a movable side.

The filtration device F3 according to the first embodiment has the casing 1, the filter element 3 arranged and fixed in the casing, the filtration mechanisms 6, 7, 8, 9, $V_I$, and $V_O$, the backwashing mechanism 104, the driving unit 13 that drives the backwashing mechanism, and a control unit (such as a CPU).

The filtration device F3 uses the backwashing mechanism 104 constituted of the backwashing head 141 arranged in surface-contact with a portion of the filter element 3, and the like as a backwashing unit, and has a high backwashing effect due to a strong suction force and the removal brush 144. It is similar to the first application example to perform brushing using the backwashing head and the removal brush during a filtration operation.

The casing 1 is constituted of the casing body 1a and the casing lid 1b. The casing body 1a has the fluid inlet 6 at an upper portion of a side wall, and the fluid outlet 7 at a lower portion of the side wall.

The inside of the casing 1 is partitioned into the raw liquid chamber 8 communicating with the fluid inlet 6 and containing a fluid before filtration, and the filtrate chamber 9 communicating with the fluid outlet 7 and containing a fluid after filtration by the filter element 3 fixed to a casing inner wall. The filtrate chamber 9 is a cylindrical annular space formed between the cylindrical filter element 3 arranged to oppose an inner side surface of a casing side wall and the casing side wall, and communicates with the fluid outlet 7.

The filter element 3 is arranged and fixed to oppose to another filter element 3 in the whole circumference of the inner side surface of the side wall of the casing 1 located lower than the fluid inlet 6, with the filtrate chamber 9 interposed therebetween. The filter element 3 is a filter that passes and filters a fluid from the raw liquid chamber 8 side to the filtrate chamber 9 side, has the filter medium 31 forming a cylindrical surface, and blocking members 32a and 32b that fix upper and lower end portions of the filter medium to an inner surface of the casing side wall in a state that upper and lower opening portions of the filter medium are closed, and captures and filters out solid contents, gelatinous dust and the like contained in a fluid as a target while passing the fluid through the filter medium 31 from the inside toward outside.

The filter medium 31 has a configuration similar to that of the filter medium of the first application example.

The rotation shaft 14 of the geared motor (the driving unit) 13 extends toward the inside of the casing while passing through the through hole 1d of the casing lid 1b, and a tip of the rotation shaft 14 is fixed to an upper end portion of a hollow cylindrical rotation central member 111 constituting the backwashing mechanism 104. The backwashing mechanism 104 including the rotation central member 111 is rotated and driven by the geared motor 13.

The backwashing mechanism 104 includes the rotation central member 111, connecting pipes 112, and the backwashing head 141. A rotation mechanism of the filter element 3 constituted of the geared motor 13 as a surface-contact-position moving unit of the removal brush, and the like and the backwashing-fluid discharge pipe 142 also constitute the backwashing mechanism 104.

The backwashing head 141 is arranged in surface-contact with a portion of the filter medium 31 to suck a fluid on the filtrate chamber 9 side by passing the fluid through openings (filter holes) of the filter medium 31 while the removal brush 144 brushes the filter medium 31, is constituted of a substantially tubular member having both axial ends being closed, and is provided in parallel to an axis of the filter medium 31 with the removal brush 144 being in surface-contact with an inner side surface (the primary side surface) of the filter medium 31. In a portion opposing the filter medium, the suction hole 143 in a slit shape is provided to cover a substantially entire length of the filter medium 31, and the removal brush 144 is planted in a periphery of the suction hole. By sucking the fluid from the filtrate chamber 9 while rotating the rotation central member 111 and the backwashing head 141 by the geared motor 13, the whole surface of the filter medium 31 can be backwashed while scraping off captured substances (non-filtered substances) with the removal brush 144 (see FIG. 4(*c*)).

With the configuration using the backwashing head, since water flow merely passes through only a local portion of the filter medium where the suction hole 143 faces, there are merits not only in that the quantity of water as a fluid used for backwashing can be saved, but also in that a device configuration and a system configuration for supplying backwashing water can be reduced in size and simplified, as compared to the type that allows passing of backwashing water through the whole filter medium surface all at once.

This effect is common to other embodiments described below.

An outer surface of a lower end portion of the rotation central member 111 is rotatably and axially supported by a bearing part 125*a* provided on one end of a tubular bearing member 125, and a lower end opening 111*a* communicates with the backwashing-fluid discharge pipe 142 via a hollow inside of the bearing member 125.

Configurations, roles, and functions of the backwashing-fluid discharge pipe 142, and the opening-closing valve $V_F$, the drain pipe 150 for discharging non-filtered substances (the retained-substance discharging unit), and the drain-side valve $V_G$ are equivalent to those of the corresponding constituent elements, for example, in the first embodiment of FIG. 1.

In the configuration example of FIG. 5, an outer peripheral portion of the backwashing-fluid discharge pipe 142 is a location where the fluid "a" from the fluid inlet cannot smoothly circulate and non-filtered substances dropping from the filter medium easily settle and are retained. Accordingly, this region is selected as the non-filtered-substance retention unit 160, and the drain pipe 150 is arranged in a casing bottom portion corresponding to this region.

The baffle plate 130 for preventing floating up of non-filtered substances is fixed in a ring shape to a side-wall inner surface (the blocking members 32*a* and 32*b*) of the casing.

Operations during filtration and backwashing of the filtration device F3 configured as above, a configuration of external piping systems 121, 122, 145, and 150A of filtration target fluid connected to the filtration device, opening and closing operation timings and the like of respective valves $V_I$, $V_O$, $V_F$, and $V_G$ during filtration and backwashing, and a removal and sifting operation of captured substances (such as solid matters and gelatinous dust) by the removal brush 144 and effects thereof are equivalent to those in FIG. 1, and thus detailed explanations thereof are omitted.

However, in the filtration device F3, differently from FIG. 1 in which the filter element 3 is rotated, the removal brush 144 is rotated regularly or constantly, or at any other appropriate timing during a filtration operation, in which the opening-closing valve $V_F$ of the backwashing-fluid discharge system is closed, so as to brush the primary side surface of the filter medium on the fixed side. Accordingly, removal unnecessary substances adhering to and deposited on the filter medium can be efficiently separated from removal target substances for effective utilization.

The respective pipe bodies 121, 122, 145, and 150A and the respective valves $V_I$, $V_O$, $V_F$, and $V_G$ above are denoted by like reference signs in all other embodiments described below.

According to the present embodiment, by using the backwashing head 141 and the like, adhering substances caused by filtration on the surface of the raw liquid chamber 8 side of the filter element 3 can be removed.

The filtration device according to this embodiment includes the removal brush 144 arranged to be capable of making a relative movement with respect to an inner surface (the primary side surface) of the filter medium 31 constituting the filter element 3 to perform separating (removing) of captured substances and sifting with respect to the captured substances during the relative movement, the driving unit 13 relatively moving the removal brush with respect to the filter element 3, the filtration mechanism, the backwashing mechanism, the casing 1 housing these components, the non-filtered-substance retention unit 160, and the control unit 300 controlling the driving unit, the filtration mechanism, and the backwashing mechanism, and performs an operating method including starting the backwashing when a filtration differential pressure between the both surfaces of the filer medium exceeds a predetermined value or as triggered by a lapse of a predetermined time while performing the filtration, and returning to the filtration after the differential pressure is eliminated or after a predetermined time elapses.

When the filtration differential pressure between the both surfaces of the filter medium exceeds the predetermined value or as triggered by a lapse of a predetermined time while performing the filtration, the non-filtered substances D are discharged to outside via the drain pipe 150 by opening the drain side valve $V_G$. Accordingly, it is possible to prevent decrease in the filtration efficiency due to that the non-filtered substances D such as coarse particles dropping without passing through the filter medium 31 and gradually retained in the non-filtered-substance retention unit 160 float up to an upper portion of the raw liquid chamber 8 upon brushing and adhere to the filter medium.

The present operating method is characterized in that the control unit 300 performs an operation of driving the driving unit to relatively move the brush with respect to the filter medium so as to sift removal unnecessary substances from the captured substances during filtration, letting the removal unnecessary substances pass to the other surface side.

The method, procedures, and effects of brushing during filtration are identical to those of the application examples and embodiments described above.

The effects and operations described above also apply to the following embodiments.

B-2: Second Embodiment of Filtration Device

Figure 6:
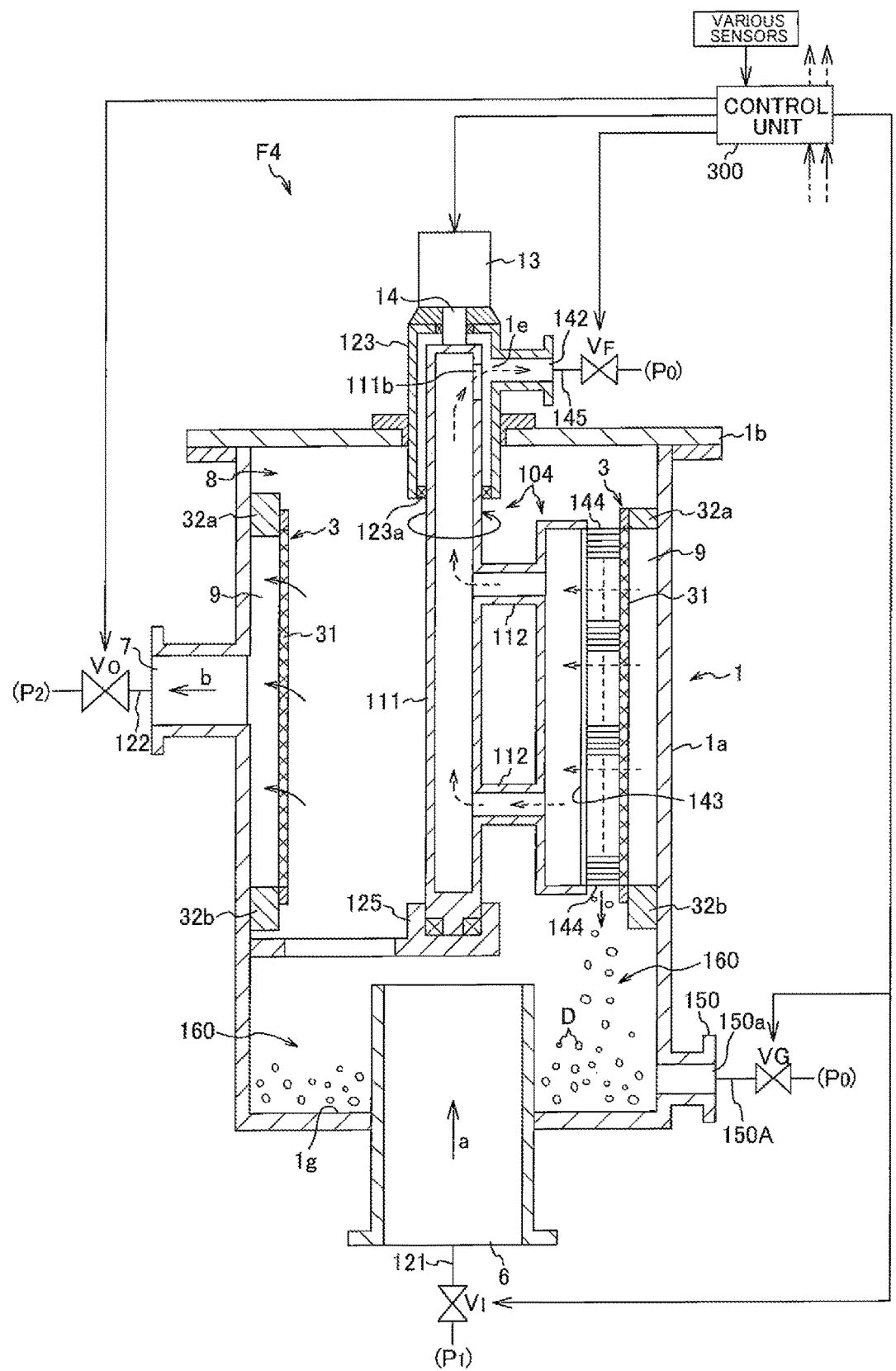
FIG. 6 is a schematic vertical cross-sectional view illustrating an overall configuration of a second embodiment of the filtration device according to the second application example of applying the operating method of the present invention.

FIG. 6 is a schematic vertical cross-sectional view illustrating an overall configuration of a second embodiment of the filtration device according to the second application example of applying the operating method of the present invention.

In a filtration device F4, configurations such as the filter element 3 arranged and fixed onto a casing inner peripheral wall and the backwashing mechanism 104 rotated and driven by the driving unit 13 are common to those of the filtration device of FIG. 5. Accordingly, common parts are denoted by like reference signs and explanations of redundant configurations and operations thereof are omitted.

The filtration device F4 according to the second embodiment generally includes the casing 1, the filter element 3 arranged and fixed in the casing 1, the filtration mechanisms 6, 7, 8, 9, $V_P$, and $V_O$, the backwashing mechanism 104, the driving unit 13 rotating and driving the backwashing mechanism, and the control unit (such as a CPU) 300.

Differently from FIG. 5, the fluid inlet 6 of the filtration device F4 is arranged at a bottom center of the casing, and supplies raw liquid to the raw liquid chamber 8 upward as indicated by an arrow "a". A lower portion of the rotation central member 111 constituting the backwashing mechanism 104 is axially supported by the bearing member 125, and an upper portion of the rotation central member 111 is arranged and fitted in a bearing pipe body 123 fixed to the casing and is axially supported by a bearing part 123a. The bearing pipe body 123 is provided with the backwashing-fluid discharge pipe 142, and the backwashing-fluid discharge pipe 142 communicates with a discharge port 111b provided in the upper portion of the rotation central member 111.

The non-filtered-substance retention unit 160 is formed on a casing bottom plate 1g corresponding to outside of a pipe body constituting the fluid inlet 6, and by releasing the drain pipe 150 formed in a lower portion of a side wall, the retained non-filtered substances D can be discharged. A location to place the drain pipe 150 is a casing bottom portion corresponding to an outer periphery of the pipe body constituting the fluid inlet 6, and in this region, water flow is low and non-filtered substances D having settled can easily remain.

A baffle plate (not illustrated) may be arranged between the non-filtered-substance retention unit 160 and the removal brush.

Operations of the backwashing mechanism 104 (the backwashing head 141) and respective valves $V_P$, $V_O$, $V_F$, and $V_G$ with respect to the filter element 3 during a filtration operation and a backwashing operation, flows of respective filtrates, a flow of backwashing liquid, and a non-filtered-substance discharge operation are the same as those in FIG. 5, and thus redundant explanations thereof are omitted.

B-3: Third Embodiment of Filtration Device

Figure 7:
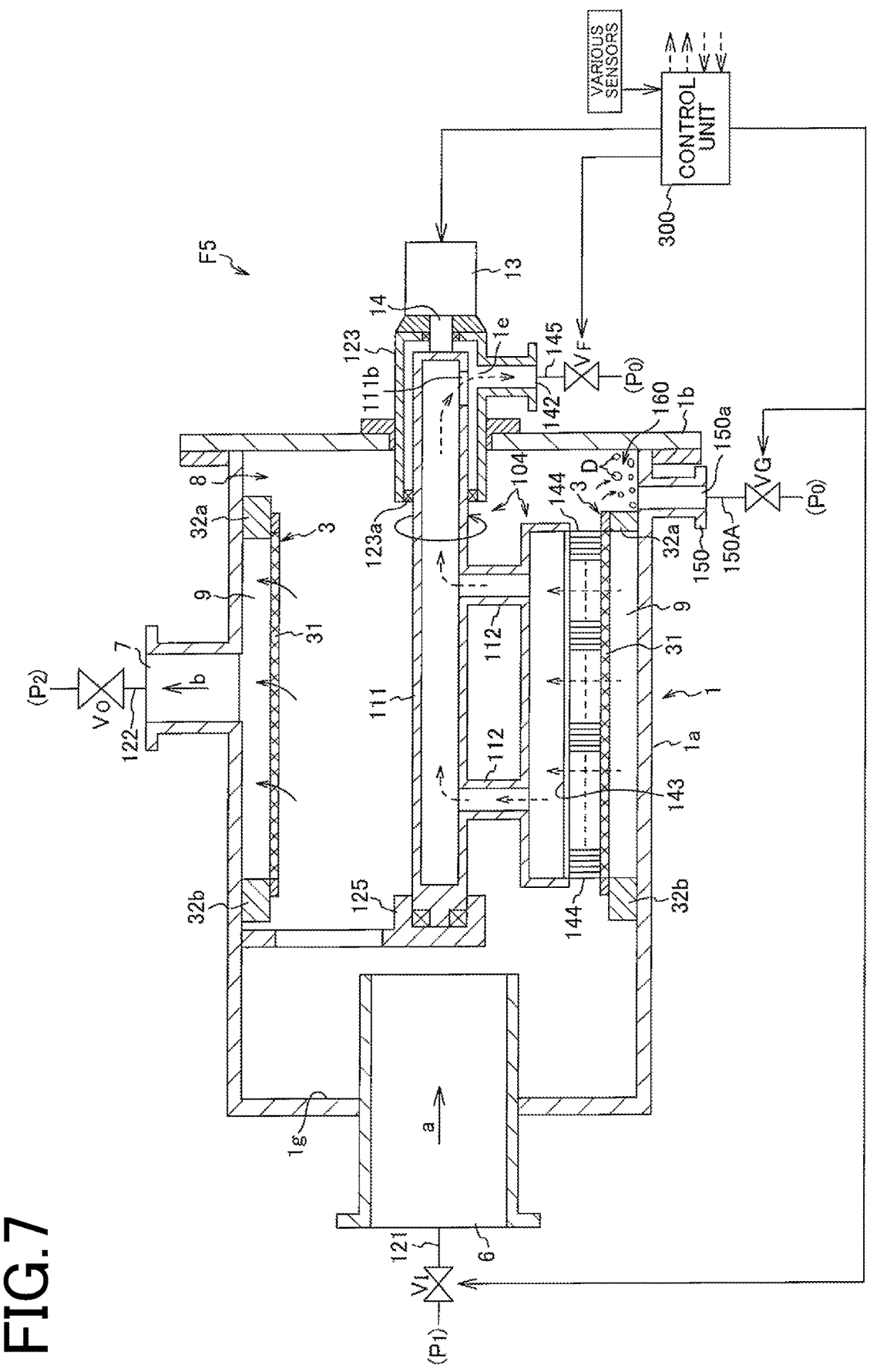
FIG. 7 is a schematic vertical cross-sectional view illustrating an overall configuration of a third embodiment of the filtration device according to the second application example of applying the operating method of the present invention.

FIG. 7 is a schematic vertical cross-sectional view illustrating an overall configuration of a third embodiment of the filtration device according to the second application example of applying the operating method of the present invention. This filtration device F5 is a horizontal type in which the filtration device F4 of FIG. 6 is turned rightward by 90 degrees, and only differs in a configuration that the non-filtered-substance retention unit 160 and the drain pipe 150 are arranged on a bottom wall near the casing lid 1b.

By arranging the non-filtered-substance retention unit 160 and the drain pipe 150 at a lower part of a casing on an axially opposite side that is the most separate location from the fluid inlet 6, it is possible to solve a problem that non-filtered substances once retained in the non-filtered-substance retention unit 160 float up by a fluid introduced via the fluid inlet 6 and are sucked on the filter medium, or the like.

Operations of the backwashing mechanism 104 (the backwashing head 141) and respective valves $V_P$, $V_O$, $V_F$, and $V_G$ with respect to the filter element 3 during a filtration operation and a backwashing operation, flows of respective filtrates, a flow of backwashing liquid, and a non-filtered-substance discharge operation are the same as those in FIG. 5 and FIG. 6, and thus redundant explanations thereof are omitted.

Example 1: Method for Operating Filtration Device for Ballast Water

When ballast water is filtered with a filter element, fibrous substances which are mainly algae adhere to and are entangled in a peripheral edge of an opening of a filter medium, and these substances are covered with other plankton, particles, or viscous matters to form strong clogging. The operation is switched to backwashing when the differential pressure exceeds a permissible value during filtration, but when backwashing is performed after filtration, there is a problem that the filter medium is clogged from an opposite direction. A method that relies only on backwashing for recovery from clogging of a filter element increases the frequency of backwashing, and also increases loss of removal unnecessary substances in liquid by backwashing as described above.

In the example 1, the operating method of the present invention was applied to the filtration devices according to the first and second application examples, and filtration of ballast water was performed. As a result of continuing brushing during a filtration period, the effect of peeling of captured substances and the effect of sizing were fully exhibited. As a result, although depending on the quality of seawater, a required time for the differential pressure to increase above a permissible value in a filtration operation increased from about ten minutes of backwashing cycle to 50-fold or more, and the backwashing frequency was improved to about every 10 hours on average, which was a frequency equal to or less than 1/50.

The filtration surface of the filter element after filtration of ballast water was performed while brushing, almost no adhesion of algae was observed, no residue of the algae was observed on the filtrate side of the filter element and only some other plankton were observed, and it was confirmed that algae passed the filter element and flew to the downstream side.

In this manner, by the operating method of the present invention, during a filtration operation, it was possible to substantially reduce the load on the filter element by letting particles not necessary to be captured flow to the filtrate side, and it was possible to prevent blocking of the openings of the filter element from the filtration side due to backwashing.

The filter element used for filtration of ballast water is required to remove plankton of the size of around 50 For example, to achieve this removal with a wire netting, although depending on the mesh wire diameter, a wire netting of about 150 to 300 meshes (the number of meshes per inch) is needed.

However, because these filter elements are thin and have low strength, reinforcement is necessary for performing filtration and backwashing. Even if filter elements are reinforced, these elements cannot be directly brushed efficiently. This is particularly the case for the filter element having the shape described in the second application example.

As a filter element that satisfies such requirements on strength, as described in the above embodiments, a sintered metal mesh with one or more layers of sintered wire nettings is preferable.

The filter element constituted of a sintered metal mesh has a mesh opening diameter of 100 µm or less, preferably 50±µm±30 µm.

Accordingly, using the filter element made of sintered wire mesh enabled to directly brush a filtration surface. By performing brushing during filtration by this filtration device using this filter element, as compared to the conventional method of the type of repeating filtration and backwashing without performing brushing during filtration, an operating time until an event due to clogging of the filter element occurs, such as a rise of the filtration differential pressure and a decrease in flow rate of filtration, or an increase in backwashing frequency was extended and the number of cycles of filtration/backwashing was increased.

Example 2: Method for Operating Filtration Device of Fuel Oil C

Filtration of fuel oil C was performed by applying the method of the present invention to the filtration devices according to the first and second application examples.

That is, with a filter element having an opening diameter of 50 µm constituted of sintered metal mesh, when fuel oil C was filtered without brushing during a filtration period at a flow rate of 10 m/h, the differential pressure was increased in 15 to 20 minutes, and the filter element became unable to continue filtration unless backwashing was performed. On the other hand, filtration was performed under the same conditions except performing brushing, an obtained result was that the differential pressure increased for the first time after a lapse of time as long as 9 hours or more.

When the filter element was inspected thereafter, similarly to the state depicted with the non-filtered substances D of FIG. 1, it was confirmed that substances larger than the opening diameter of the filter element were captured in concentration on the primary side of the filter element, and it was found that clogging of the filter element was reduced by dispersing fuel oil components (excluding large particles) having turned into a gelatinous state by brushing during filtration to let the components flow to the downstream side of the filter element. It was possible for substances larger than the opening diameter of the filter element which were concentrated on the primary side of the filter to be discharged through the backwashing line or through a drain for draining liquid, and after this operation was performed, filtration for about six hours was continuously possible again.

In order to select particles as removal unnecessary substances by whether to pass the openings of the filter element, it is necessary that the particles relatively move with respect to the filter element. In order to prevent aggregation of particles with each other, and adhesion and aggregation of viscous or gelatinous substances, it is desirable to have both of a function to disperse aggregated particles from each other and a function to separate and disperse viscous or gelatinous substances and particles.

The invention of the present application has been made based on the knowledge that a method of brushing a filter medium surface during filtration excels as a method exhibiting such a separation function and a dispersion function and having a simple mechanism and a high effect.

[Relationship of Opening Diameter of Filter Medium and Thicknesses of Brush Bristles, and the Like]

In the case of a filter element having an opening diameter smaller than 200 µm, if captured substances on the filter element are wiped using a plate-shaped scraper, the filter-captured substances tend to be clogged in a recessed surface because a distal edge of the scraper do not fit well with concaves and convexes of the filter medium surface, and thus use of a scraper is not preferable.

On the other hand, when a brush is used, the brush fits well with the concaves and convexes (particularly in concaves) of the surface of the filter medium and efficiently removes or crushes filter-captured substances, allowing the substances flow to downstream of the filter element. When thicknesses of bristles of the brush are too thick, the brush does not fit well with concaves and convexes of the filter surface similarly to the case of wiping with a scraper, and the captured substances are pushed into the filter element openings and causes clogging on the contrary. This tendency is significant with a filter medium using a mesh.

Figure 8A:
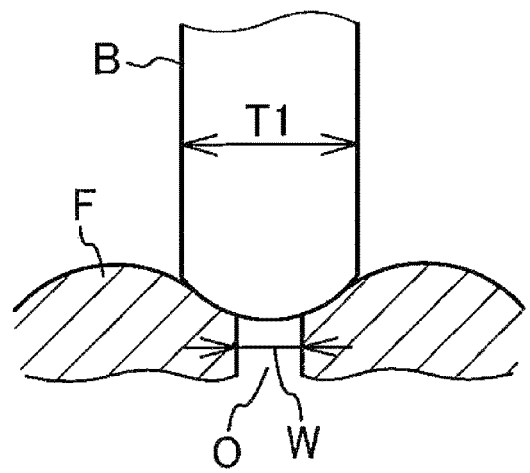
FIGS. 8(a) and 8(b) are schematic diagrams illustrating relationships between thicknesses T of brush bristles B and a diameter W of an opening O.
Figure 8B:
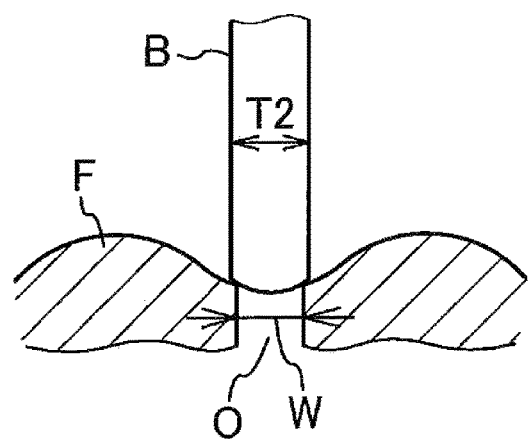

Regarding the thicknesses of bristles of the brush, there was an effect of sifting removal unnecessary substances in captured substances with thicknesses up to about four-fold of the opening diameter of the filter element, and there was a large effect of sifting by bristles with thicknesses up to about double the opening diameter in particular. FIGS. 8(*a*) and 8(*b*) are schematic diagrams illustrating relationships between thicknesses T of brush bristles B and a diameter W of an opening O. Not only when a thickness T1 of the brush bristle B is about three-fold of the opening diameter as in FIG. 8(*a*) but also when a thickness T2 of the brush bristle B is slightly larger than the opening diameter W as in FIG. 8(*b*), the bristle ends can fit well with concaves of the filter surface, and the bristles do not facilitate clogging by pushing the captured substances into the filter element opening O.

Because captured matters adhering to the filter medium surface just after filtration in particular are sufficiently soft, it is possible to sift (and crush) non-removed substances and removal unnecessary substances by elastic force of the brush bristles.

Figure 9:
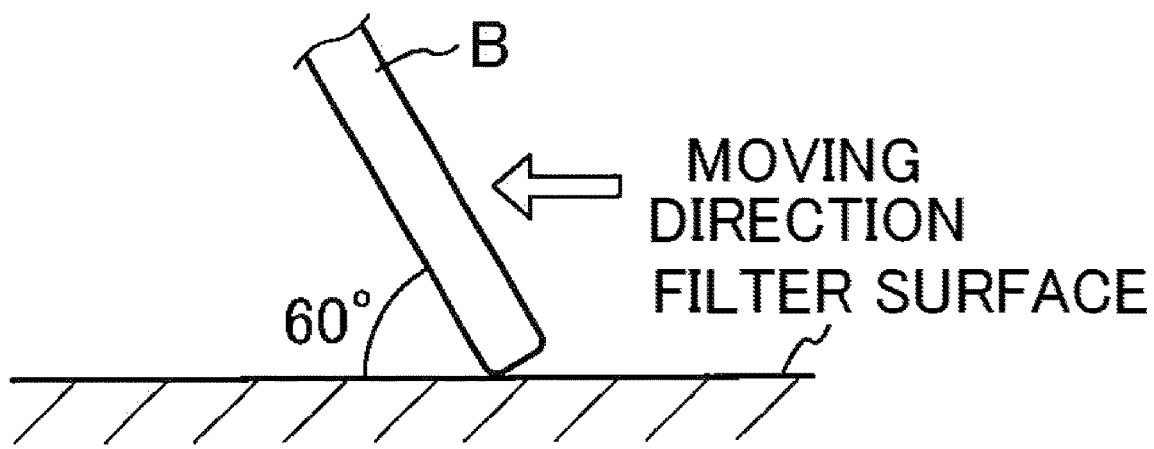
FIG. 9 is a diagram illustrating an optimum value of an angle of contact between a filter medium surface and brush bristles.
Figure 10A:
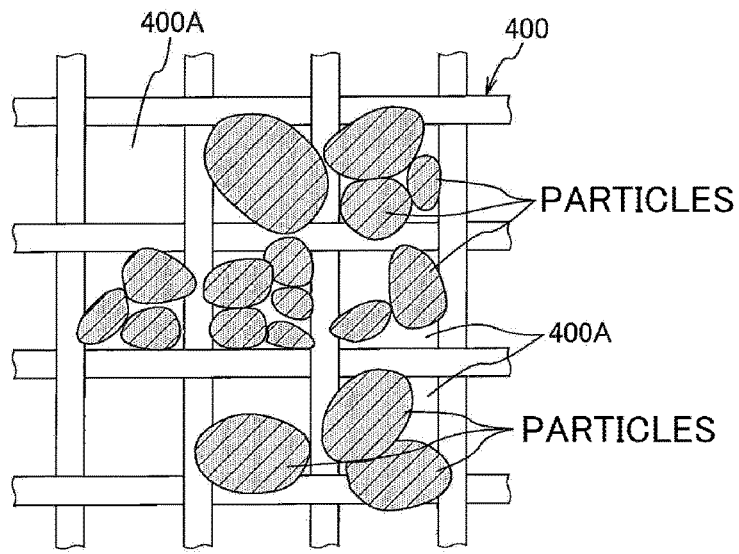
FIG. 10(a) is an image view of a state that clogging occurs on a filtration side of a filter medium as viewed from a direction orthogonal to a filter medium surface.
Figure 10B:
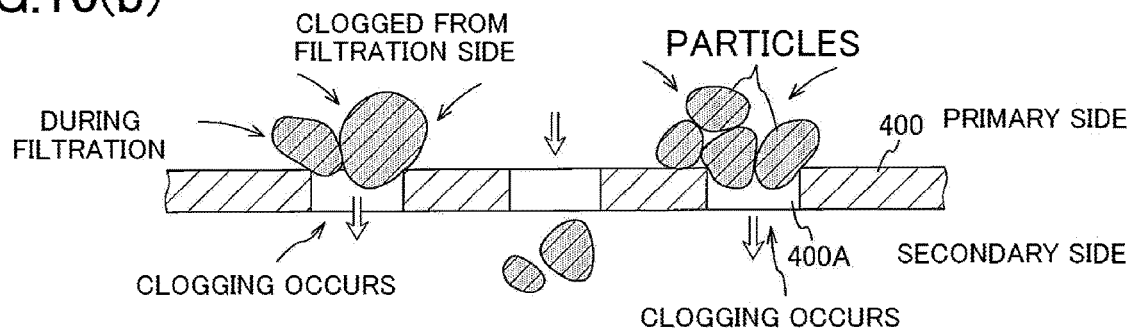
FIG. 10(b) is a cross-sectional view illustrating the clogging state on the filtration side.
Figure 10C:
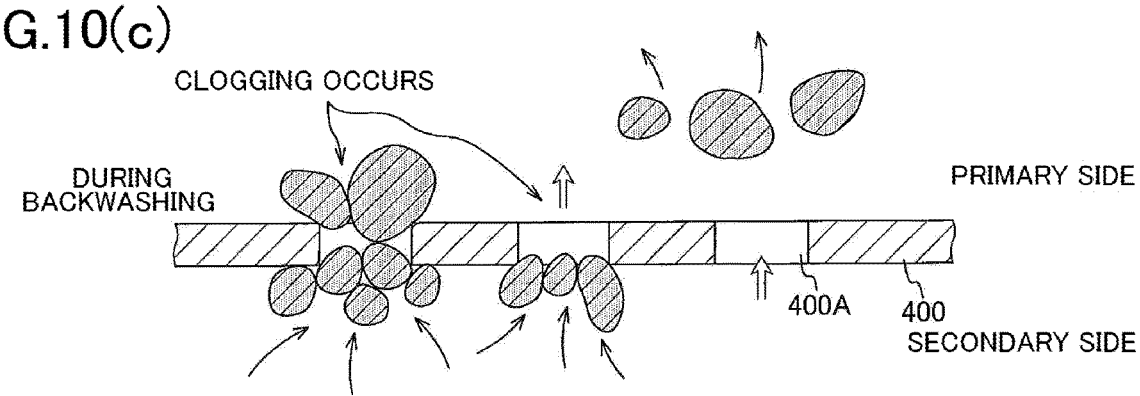
FIG. 10(c) is a cross-sectional view illustrating a state that clogging occurs on a backwashing side by backwashing.

As illustrated in FIG. 9, upon brushing, the angle of contact between the filter medium surface and the brush bristle B is preferably 60 degrees or greater (60 degrees to 70 degrees). When the angle is smaller than this angle, the influence to push filter-captured substances into openings tends to increase.

[Summary of Configurations, Operations, and Effects of Present Invention]

The method for operating a filtration device according to a first mode example is a method for operating a filtration device, wherein the filtration device comprises the filter element 3 having the filter medium 31 constituted of a metal mesh material, in which during filtration to pass a fluid from one surface side to the other surface side of the filter medium, substances in the fluid are captured on the one surface, and during backwashing to pass a fluid from the other surface side to the one surface side of the filter medium, the captured substances are separated from the filter medium, the brush 144 arranged to be capable of making a relative movement with respect to the one surface of the filter medium and assisting in separating (removing) the captured substances and sifting with respect to the captured substances during the relative movement, the driving unit 13 relatively moving at least one of the brush or the filter element with respect to the other, the filtration mechanism passing a fluid from the one surface side to the other surface side of the filter medium and the backwashing mechanism 104 passing a fluid from the other surface side to the one surface side of the filter medium, the casing 1 accommodating and supporting at least a part of at least the filter element, the filtration mechanism, and the backwashing mechanism, and the control unit 300 controlling the driving unit, the filtration mechanism, and the backwashing mechanism, wherein the operating method of a filtration device comprises starting the backwashing when a differential pressure between the both surfaces of the filter medium exceeds a predetermined value or as triggered by a lapse of a predetermined time while performing the filtration, and returning to the filtration after the differential pressure is eliminated or after a predetermined time elapses, and the control unit performs a sifting operation of driving the driving unit to relatively move the brush with respect to the filter medium so as to sift removal unnecessary substances from the captured substances and pass the removal unnecessary substances to the other surface side during filtration.

The filtration recognized in general is directed to filtering all solids without screening by size. On the other hand, the sifting performed in the operating method according to the present invention is directed to separating and screening solids by size, which differs in its essential meaning, purpose, and effect from mere filtration.

In a conventional cleaning method combining brushing and backwashing, the role of the brush is just to peel off particles and residues from a filter element in backwashing, which have been deposited and caused clogging on the filter medium surface on the primary side in filtration performed in advance. These particles and residues peeled off from the filter element are removed to outside of the system.

On the other hand, in the present invention, since solids are separated and screened by size by brushing during filtration, removal unnecessary substances in captured substances can be efficiently secured in the filtrate while delaying occurrence of clogging during filtration. By prolonging the duration of the filtration operation, the number of times of backwashing is reduced, and occurrence of clogging from the secondary side, which is a demerit of backwashing, can also be prevented.

In the method for operating a filtration device according to a second mode example, in the operation of sifting the removal unnecessary substances from the captured substances, when a plurality of particles constituting the removal unnecessary substances are solidified, the brush is relatively moved on the filter medium wall so as to crush the solidified particles to a size with which the particles can pass through openings of the filter medium.

In this manner, a difference becomes clear between the conventional simple filtration that does not screen solids in raw liquid by size and the sifting in the present invention that screens solids by size.

In the method for operating a filtration device according to a third mode example, the filter element has an opening diameter of the filter surface of 100 μm or less, preferably 50 μm±30 μm.

As this filter element, for example, a sintered metal mesh can be used.

In the method for operating a filtration device according to a fourth mode example, the fluid as the filtration target is ceramics raw material slurry, pigment slurry, coating liquid for paper or film, heavy oil, cooling water, or ship ballast water.

The operating method of the present invention is applicable to a filtration device processing various types of raw liquids, and by applying the operating method to the processing of these row liquids, excellent economic effects (improvement in operating rate and reduction in loss) can be exhibited.

In the method for operating a filtration device according to a fifth mode example, the fluid as the filtration target is a fluid having a viscosity of 0.2 to 1000 mPa·s.

When the operating method of the present invention was applied to a highly viscous fluid, for example, fuel oil C, to perform sifting, removal unnecessary substances in captured substances were efficiently secured in the filtrate. By prolonging the duration of the filtration operation, the number of times of backwashing is reduced, and occurrence of clogging from the secondary side, which is a demerit of backwashing, can also be prevented.

In a range of viscosity, 0.2 to 5000 mPa·s, it was the range of 0.2 to 1000 mPa·s in which the sifting effect was particularly large and the practicability was high.

In an actual experiment, the operating method was applied to filtration of oil other than heavy oil, and further of chemical products and raw materials thereof, food, and the like, and preferable results were obtained.

In the method for operating a filtration device according to a sixth mode example, inside the casing, the non-filtered-substance retention unit 160 is provided that retains non-filtered substances separated from one surface side of the filter medium without passing through the filter medium during filtration, and the retained-substance discharging unit 150 that discharges the non-filtered substances to outside of the casing is arranged in a casing part.

Since the captured substances (non-filtered substances) such as coarse particles remaining on the filter medium during filtration are separated from the filter medium surface by brushing during filtration and accumulate in the non-filtered-substance retention unit 160 provided in the casing, they can be discharged to outside of the system by opening the drain side valve $V_G$. That is, while delaying occurrence of clogging during filtration by prolonging the duration of the filtration operation by performing brushing during a filtration operation, removal unnecessary substances in captured substances can be efficiently secured in the filtrate. As a result, the number of times of backwashing and the backwashing time can be reduced, and thus the operation efficiency can be increased and occurrence of clogging from the secondary side, which is a demerit of backwashing, can also be prevented.

The brushing during filtration is performed intermittently, continuously, or depending on conditions of the raw liquid. Alternatively, the brushing is performed depending on the degree of differential pressure.

Backwashing is performed when the differential pressure still increases even by a combination of brushing during filtration and discharging of non-filtered substances by releasing the drain side valve $V_G$. Alternatively, it is also possible that the non-filtered substances of the non-filtered-substance retention unit are discharged through the retained-substance discharging unit after backwashing.

The baffle plate described in the embodiments is not essential.

The operating method of a filtration device according to a seventh mode example includes a step of continuously or intermittently performing a sifting operation by a relative movement between the brush and the filter medium during filtration, a step of measuring a filtration differential pressure between the one surface side and the other surface side of the filter medium, and performing the sifting operation when the filtration differential pressure exceeds a permissible value, and a step of measuring the filtration differential pressure and discharging the non-filtered substances in the non-filtered-substance retention unit to outside of the casing by the retained-substance discharging unit or performing backwashing by the backwashing mechanism when the filtration differential pressure exceeds a permissible value.

According to this operating method, since the filtration is performed while brushing the filter medium to recover the filter medium from clogging, the number of times of backwashing and the backwashing time can be reduced, and thus the operation efficiency can be increased. By discharging the non-filtered substances separated from the filter medium by brushing during filtration and retained in the non-filtered-substance retention unit to outside of the system while monitoring the differential pressure, the number of times of backwashing and the backwashing time can be reduced, and thus the operation efficiency can be increased.

REFERENCE SIGNS LIST

F1-F5 ... filtration devices, 1 ... casing, 1a ... casing body, 1b ... casing lid, 2 ... partition wall, 3 ... filter element, 6 ... fluid inlet, 7 ... fluid outlet, 8 ... raw liquid chamber, 9 ... filtrate chamber, 13 ... geared motor (driving unit), 14 ... rotation shaft, 104 ... backwashing mechanism, 121 ... inlet side piping, 122 ... outlet side piping, 141 ... backwashing head, 142 ... backwashing-fluid discharge pipe, 143 ... suction hole, 144 ... removal brush, 145 ... discharge pipe, 150 ... drain pipe (retained-substance discharging unit), 160 ... non-filtered-substance retention unit, $V_I$ ... inlet side valve, $V_O$ ... outlet side valve, $V_F$ ... opening-closing valve, $V_G$ ... drain side valve (retained-substance discharging unit), 300 ... control unit

The invention claimed is:

1. A method for operating a filtration device, wherein the filtration device comprises:
   a filter element having a filter medium constituted of a metal mesh material, in which during filtration to pass a fluid from one surface side to the other surface side of the filter medium, substances in the fluid are captured on the one surface, and during backwashing to pass a fluid from the other surface side to the one surface side of the filter medium, the captured substances are separated from the filter medium;
   a brush arranged to be capable of making a relative movement with respect to the one surface of the filter medium and assisting in separating the captured substances and sifting with respect to the captured substances during the relative movement;
   a driving motor causing the brush or the filter element to rotate;
   a filtration mechanism passing a fluid from the one surface side to the other surface side of the filter medium and a backwashing mechanism passing a fluid from the other surface side to the one surface side of the filter medium;
   a casing supporting at least the filter element, the filtration mechanism, and the backwashing mechanism; and
   a control unit controlling the driving motor, the filtration mechanism, and the backwashing mechanism, wherein the operating method of a filtration device comprises starting the backwashing when a differential pressure between both surfaces of the filter medium exceeds a predetermined value or as triggered by a lapse of a predetermined time while performing the filtration, and returning to the filtration after the differential pressure is eliminated or after a predetermined time elapses, and
   wherein, the control unit, while the fluid passes through the filter medium during both the filtering and the backwashing, by controlling the driving motor so as to cause of the brush or the filter element to rotate, cause the filter element to relatively move with respect to the filter medium so as to cause the brush to perform brushing and the control unit, during the filtering, performs a sifting operation of crushing the captured substances by brushing performed by the brush, sifting removal unnecessary substances from the captured substances and passing the removal unnecessary substances to the other surface side.

2. The method for operating a filtration device according to claim 1, wherein in an operation of sifting the removal unnecessary substances from the captured substances, when a plurality of particles constituting the removal unnecessary substances are solidified, the brush is relatively moved on the filter medium wall so as to crush the solidified particles to a size with which the particles can pass through openings of the filter medium.

3. The method for operating a filtration device according to claim 1, wherein the filter element has an opening diameter of a filter surface of 100 μm or less.

4. The method for operating a filtration device according to claim 1, wherein the fluid as a filtration target is one of ceramic raw material slurry, pigment slurry, coating solution for paper or film, heavy oil, cooling water, and ballast water of ships.

5. The method for operating a filtration device according to claim 1, wherein the fluid as a filtration target is a fluid having a viscosity of 0.2 to 1000 mPa s.

6. The method for operating a filtration device according to claim 1, wherein inside the casing, a non-filtered-substance retention unit is provided that retains non-filtered substances separated from the one surface side of the filter medium without passing through the filter medium during the filtration, and
   a retained-substance discharging unit that discharges the non-filtered substances to outside of the casing is arranged in the casing.

7. The method for operating a filtration device according claim 6, further comprising:
   a step of continuously or intermittently performing a sifting operation by a relative movement between the brush and the filter medium during the filtration; a step of measuring a filtration differential pressure between the one surface side and the other surface side of the filter medium, and performing the sifting operation when the filtration differential pressure exceeds a permissible value; and
   a step of measuring the filtration differential pressure and discharging the non-filtered substances in the non-filtered-substance retention unit to outside of the casing by the retained-substance discharging unit or performing backwashing by the backwashing mechanism when the filtration differential pressure exceeds a permissible value.

* * * * *